United States Patent
Iwase et al.

(10) Patent No.: US 8,724,960 B2
(45) Date of Patent: May 13, 2014

(54) IMAGING DEVICE, IMAGE PROCESSING METHOD, AND PROGRAM THEREOF

(75) Inventors: Ayako Iwase, Kanagawa (JP); Yuji Saitou, Tokyo (JP); Takashi Nunomaki, Kanagawa (JP); Nobuki Furue, Tokyo (JP); Shinichi Iriya, Kanagawa (JP); Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 12/825,720

(22) Filed: Jun. 29, 2010

(65) Prior Publication Data
US 2011/0085778 A1    Apr. 14, 2011

(30) Foreign Application Priority Data
Jul. 9, 2009    (JP) ................. P2009-162839

(51) Int. Cl.
*H04N 5/77* (2006.01)
(52) U.S. Cl.
USPC ............................................. 386/228
(58) Field of Classification Search
None
See application file for complete search history.

(56) References Cited

U.S. PATENT DOCUMENTS

| 2003/0031460 | A1* | 2/2003 | Obrador | 386/52 |
| 2007/0217761 | A1* | 9/2007 | Chen et al. | 386/86 |
| 2008/0316304 | A1* | 12/2008 | Claus et al. | 348/61 |

FOREIGN PATENT DOCUMENTS

| JP | 2006-244074 A | 9/2006 |
| JP | 2007-134771 A | 5/2007 |
| JP | 2007-274400 A | 10/2007 |
| JP | 2008-166988 A | 7/2008 |
| JP | 2008-252296 A | 10/2008 |

\* cited by examiner

*Primary Examiner* — Thai Tran
*Assistant Examiner* — Sunghyoun Park
(74) *Attorney, Agent, or Firm* — Wolf, Greenfield & Sacks, P.C.

(57) ABSTRACT

An imaging device includes a display unit for displaying a video image being captured, an index operating unit for inputting an instruction for an index, and an index setting unit for setting as an index section, a section in the video image captured for a predetermined time period including a time point of a user's operation of inputting the instruction for the index, in response to one user's operation on the index operating unit while the video image is captured.

2 Claims, 21 Drawing Sheets

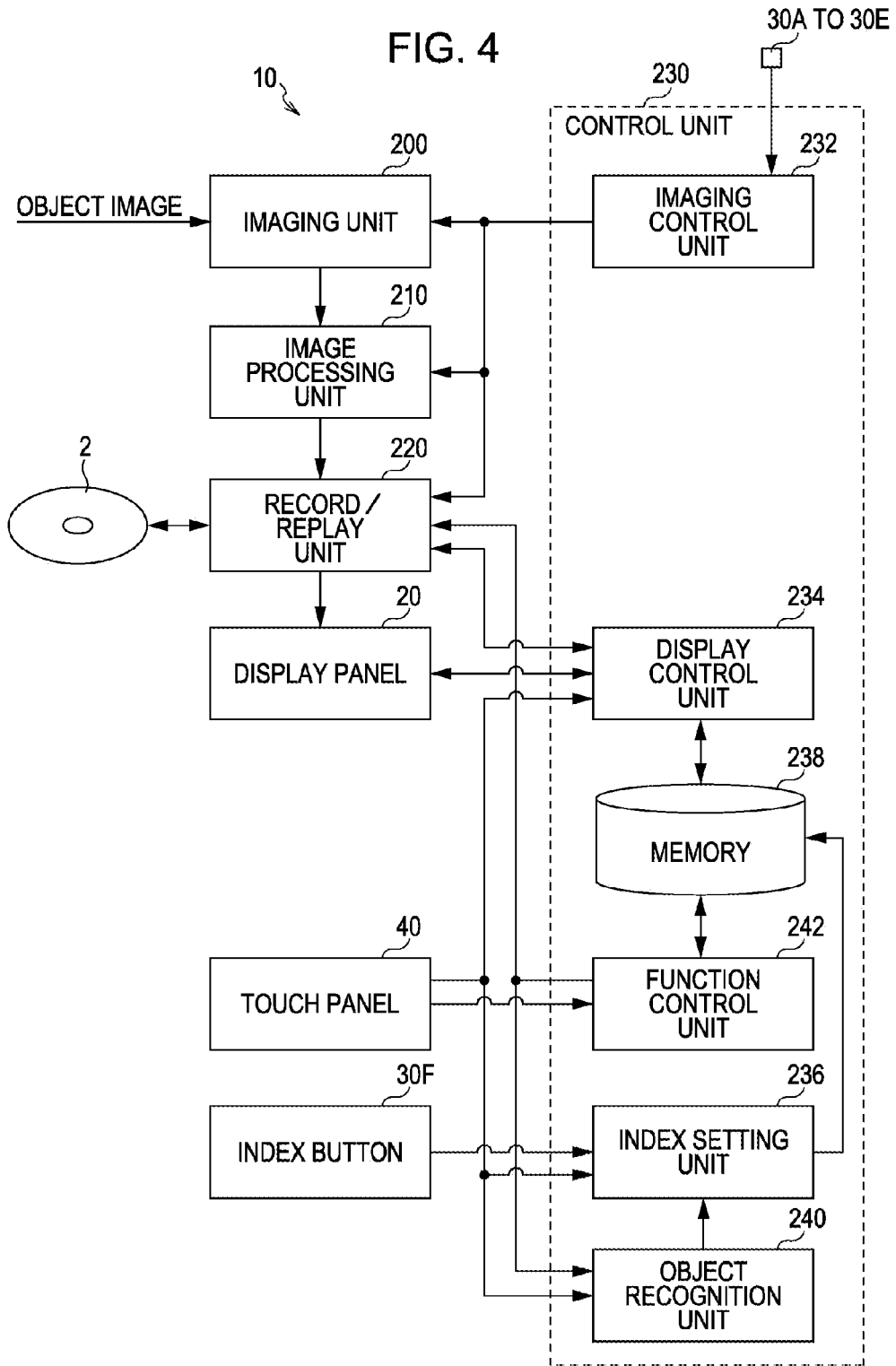

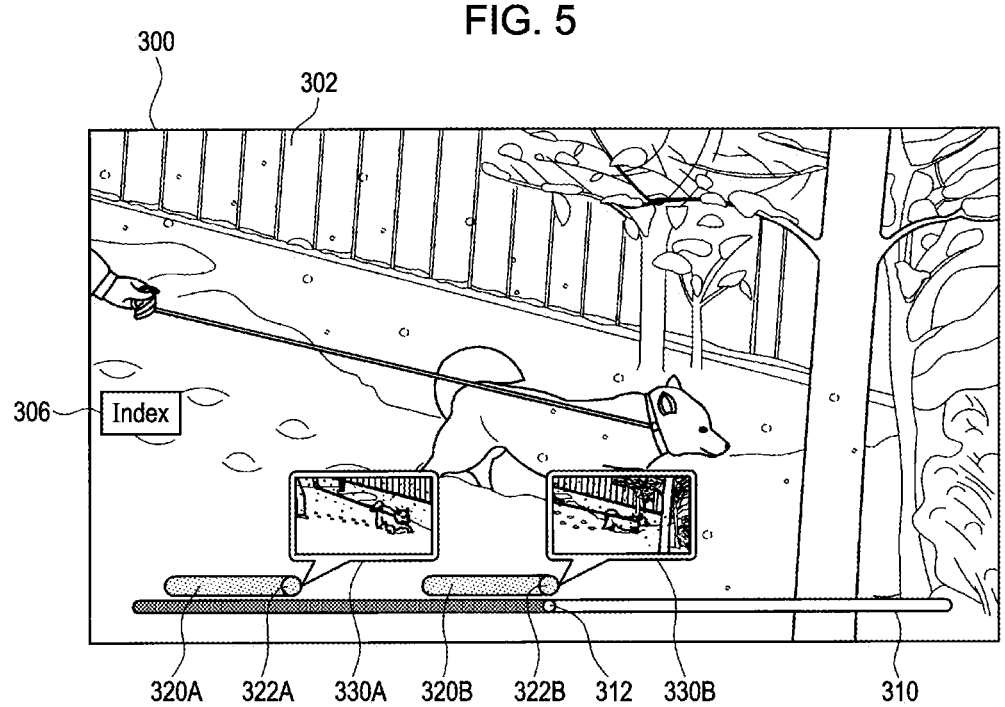

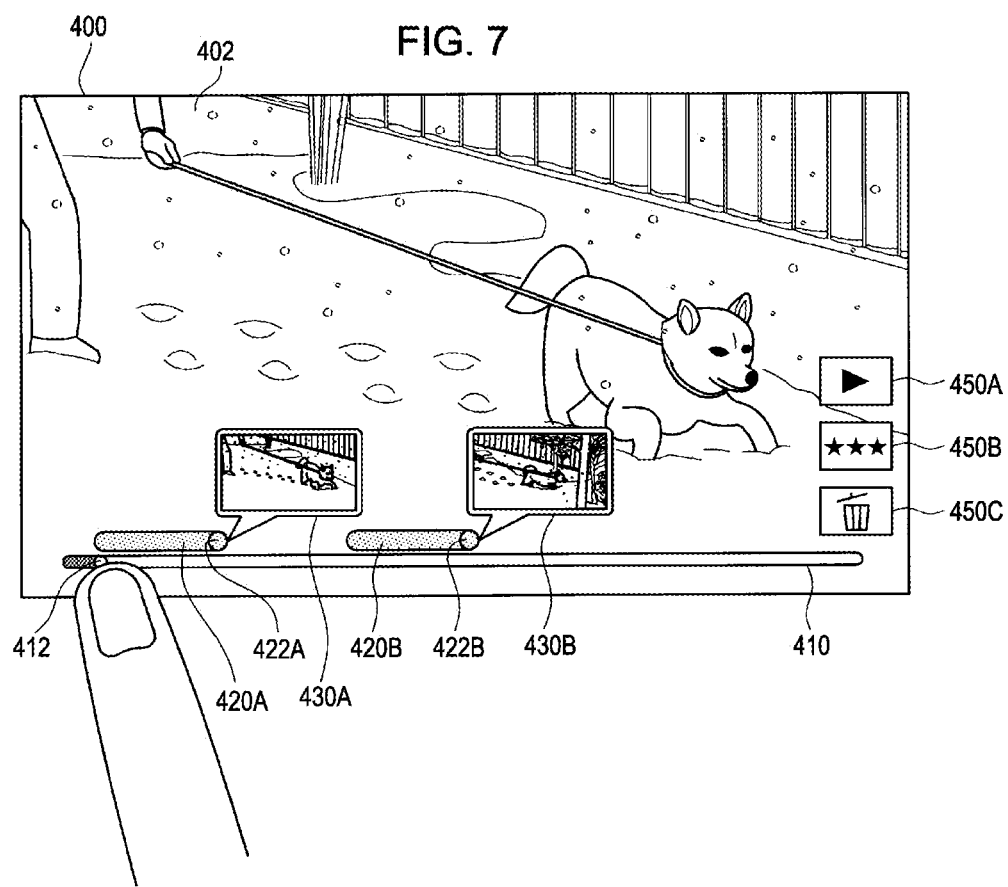

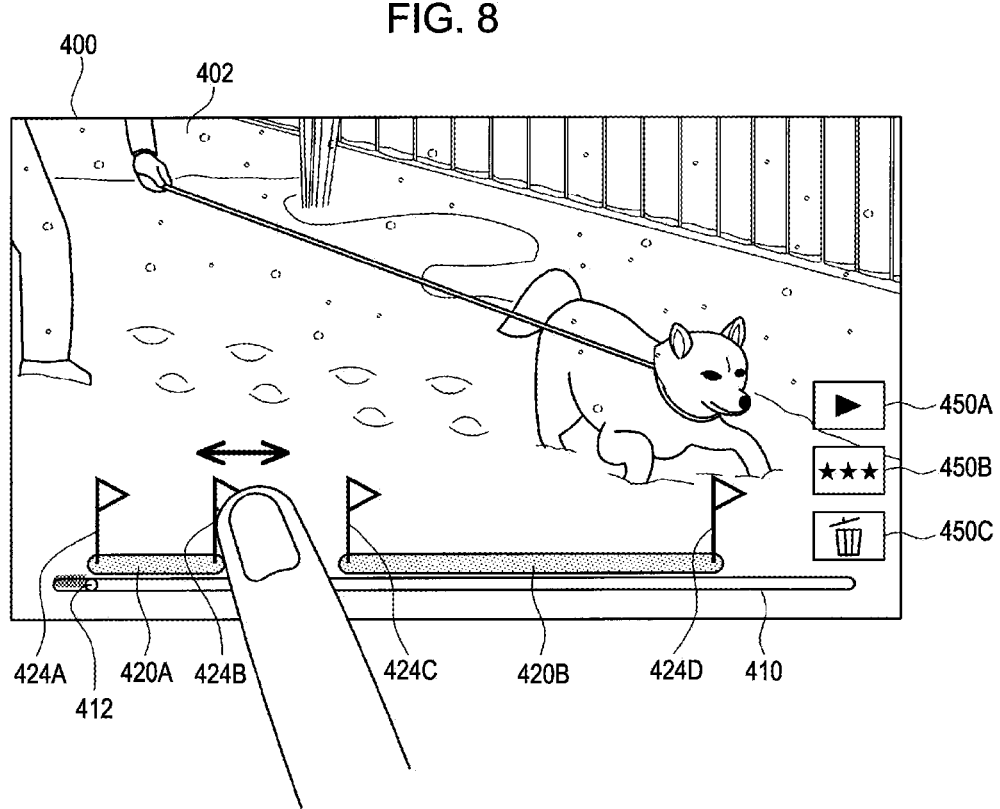

FIG. 19

| LENGTH OF ADDED SECTION | SLIDING LENGTH |
|---|---|
| ▬ | ⟶ |
| ▬ | ⟶ |
| ▬ | ⟶ |

IMAGING DEVICE, IMAGE PROCESSING METHOD, AND PROGRAM THEREOF

BACKGROUND OF THE INVENTION

1. Field of the Invention

The present invention relates to an imaging device, an image processing method, and a program thereof.

2. Description of the Related Art

A personal computer (hereinafter, referred to as a PC) is typically used for editing video images captured by an imaging device such as a digital video camera. A film-roll display is one of the methods for grasping an outline of the video image at the time of editing it. The film-roll display is a method in which a plurality of frame images is selected from the recorded video image at a predetermined time interval and the frame images are arranged and displayed in time-series order as thumbnail images (see Japanese Unexamined Patent Application Publication Nos. 2007-134771 and 2008-166988, for example).

SUMMARY OF THE INVENTION

In many cases, however, the video images were edited by PCs after a passage of time from the day when the video images were captured. Accordingly, it took a long time to pick up the necessary parts from the video images and edit them, and the working efficiency was unfavorable. More, specifically, it was necessary for users to replay the video images from the beginning thereof so as to find the necessary parts and then pick them up (edit them) since the users do not remember the contents of the video images, which were captured before, clearly. For example, there is a case in which a user wants to determine whether or not each part of a video image is necessary and delete the unnecessary parts from the video image after a long time has passed since the video image was captured. In this case, it was necessary for the user to replay the video image from the beginning thereof, take time to watch the contents of the video image, and then determine which parts were to be deleted. Particularly, when the recording time of the video image was long, it was significantly inefficient and complicated to edit the video image.

From the view point of replaying the video images, there was a similar problem. For example, when the recording time of a video image was long, and only a part of it was worth watching, it was difficult for a user to find which section of the video image was to be watched as a priority, after the passage of time from the day when the video image had been captured. Therefore, it was necessary for the user to replay and watch the video image from the beginning thereof. When there was no scene in the thumbnail images, which the user wanted to watch, even if the film-roll display was used, it was necessary to replay the video image and take time to watch the contents thereof. As described above, it was inefficient to the user in finding the sections of the video image, which the user wanted to watch even at the time of replaying the video image.

In this regard, an index could be provided to an exciting scene in a video image while it was being captured, and was conveniently used at the time of editing and replaying the video image thereafter. However, even when the index was provided to a certain time point of the video image while the video image was being captured, it was difficult to find out the range of the necessary part before and after the index. As a result, it was necessary for a user to watch the video image before and after the time point to which the index was provided and determine the range of the necessary section. Furthermore, a plurality of operations was necessary for providing the index not to a time point but to a section of the video image, and the operations were complicated for the user.

It is desirable to provide an index not to a time point but to a section of a video image with simple operations while the video image is captured.

According to an embodiment of the present invention, there is provided an imaging device including: a display unit for displaying a video image being captured; an index operating unit for inputting an instruction for an index; and an index setting unit for setting as an index section, a section in the video image captured for a predetermined time period including a time point of a user's operation of inputting the instruction for the index, in response to one user's operation on the index operating unit while the video image is captured.

Here, the index operating unit may include a position detecting unit for detecting a position in a display screen of the display unit, which an operating body touched or approached. In addition, the user's operation may include allowing the operating body to touch or approach the display screen.

The imaging device may further include an object recognition unit for recognizing an object which appears in the video image. Here, the position detecting unit may detect a position on the display screen, which was designated by the operating body while the video image was being captured. In addition, the object recognition unit may recognize the object which appears in the position on the display screen, which was designated by the operating body. Moreover, the index setting unit may set as the index section, the section in the video image, in which the object recognized by the object recognition unit appears.

The imaging device may further include a deletion unit for deleting a section in the video image which is captured before the index section, when the section in the video image in which the object appears is set as the index section while the video image is captured.

The position detecting unit may detect a sliding method of the operating body on the display screen when the operating body slides on the display screen while the video image is captured. In addition, the index setting unit may set the index section in accordance with the sliding method.

The position detecting unit may detect the sliding direction of the operating body. In addition, the index setting unit may set the index section in accordance with the sliding direction while using the time point at which the operating body slides on the display screen as a reference.

The position detecting unit may detect the sliding length of the operating body. In addition, the index setting unit may set the index section which employs as the start point, the time point preceding the time point at which the operating body slides on the display screen by the time decided in accordance with the sliding length.

The imaging device may further include: a recording unit for associating the index information representing the index section with the video image and recording the index information in a recording medium; and a display control unit for causing the display unit to display a record confirmation screen of the video image immediately after the instruction for the completion of the recording of the video image, making a correspondence relationship between a display object representing the index section and a time axis representing the recording time of the video image based on the index information, and displaying the display object on the record confirmation screen. In addition, the position detecting unit may detect a user's operation on the display object representing the index section displayed on the record confirmation screen.

Moreover, the index setting unit may adjust the index section in response to the user's operation.

The imaging device may further include a deletion unit for deleting the sections other than the index section in the video image in response to the user's operation on an icon displayed on the record confirmation screen.

The imaging device may further include a display control unit for making a correspondence relationship between the display object representing the index section and the time axis representing the recording time of the video image and displaying the display object on a live-view screen displayed on the display unit while the video image is captured.

According to another embodiment of the present invention, there is provided an image processing method including the steps of: displaying a video image being captured on a display unit while capturing the video image; and setting as an index section, a section in the video image captured in a predetermined time period including the time point of a user's operation of inputting an instruction for an index, in response to one user's operation on an index operating unit for inputting the instruction for the index while the video image is captured.

In addition, according to still another embodiment of the present invention, there is provided a program for causing a computer to execute the steps of: displaying a video image being captured on a display unit while the video image is captured; and setting as an index section, a section in the video image captured in a predetermined time period including the time point of a user's operation of inputting an instruction for an index, in response to one user's operation on an index operating unit for inputting the instruction for the index while the video image is captured.

With above-mentioned configuration, the video image being captured is displayed while it is captured, and a section in the video image captured for a predetermined time period including the time point at which the user operates to input the instruction for the index is set as an index section in response to one user's operation on the index operating unit for inputting an instruction for the index while the video image is captured. As a result, it is possible to set the index section in response to one user's operation on the index operating unit while the time point at which the user inputs the instruction for the index is used as a reference.

According to the embodiments of the present invention, it is possible to provide an index not to a time point but to a section of a video image with simple operations while the video image is captured.

BRIEF DESCRIPTION OF THE DRAWINGS

FIG. 4 is a block diagram illustrating a functional configuration of the imaging device according to the first embodiment of the invention;

FIG. 5 is a diagram illustrating a display example of a live-view screen according to the first embodiment of the invention;

FIG. 7 is a diagram illustrating a display example of a record confirmation screen according to the first embodiment of the invention;

FIG. 8 is a diagram illustrating an adjustment example of the index section in the record confirmation screen according to the first embodiment of the invention;

FIG. 19 is a diagram illustrating a relationship between a sliding length and a time length of an added section according to the third embodiment of the invention.

DESCRIPTION OF THE PREFERRED EMBODIMENTS

Figure 1:
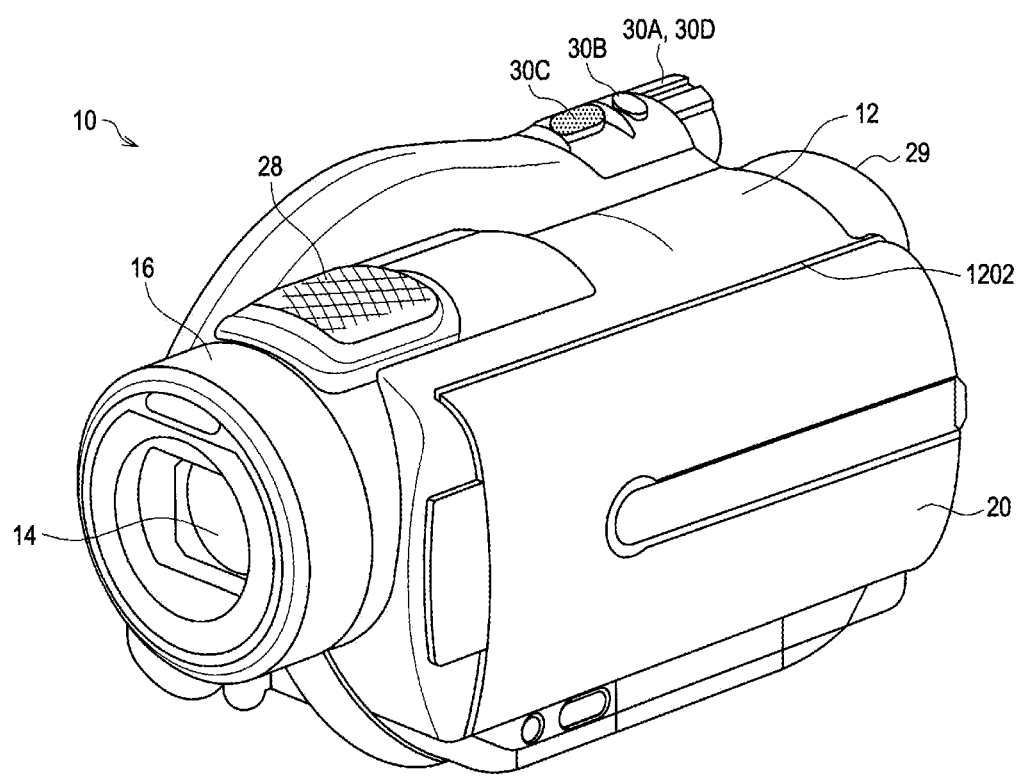
FIG. 1 is a perspective view illustrating an external configuration on a front side of an imaging device according to a first embodiment of the invention.

Hereinafter, the description will be made of the preferred embodiments of the present invention with reference to the accompanying drawings. In this regard, the components with identical reference numerals indicate the items with substantially identical functional configurations, and thus further description will be omitted.

Furthermore, the description will be made in the following order:

1. First Embodiment (Setting of Index Section in Response to Index Instruction)
2. Second Embodiment (Setting of Index Section Using Object Recognition)
3. Third Embodiment (Setting of Index Section in Response to User's Gesture)
4. Conclusion 1. First Embodiment

[Configuration of Imaging Device]

Figure 2:
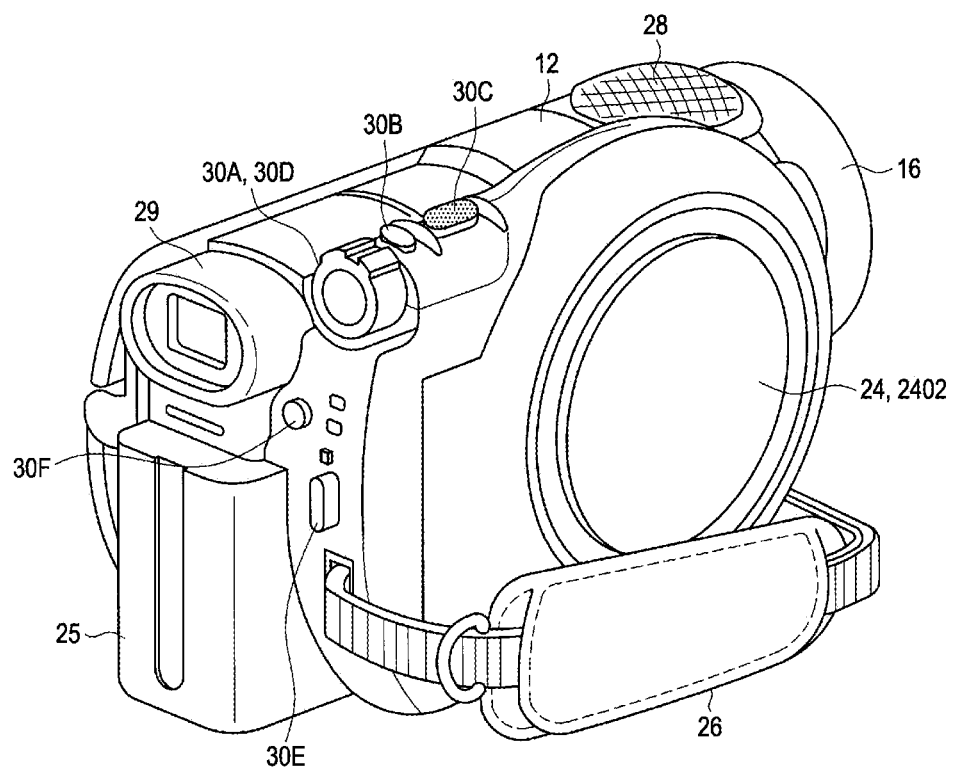
FIG. 2 is a perspective view illustrating an external configuration on a back side of the imaging device according to the first embodiment of the invention.
Figure 3:
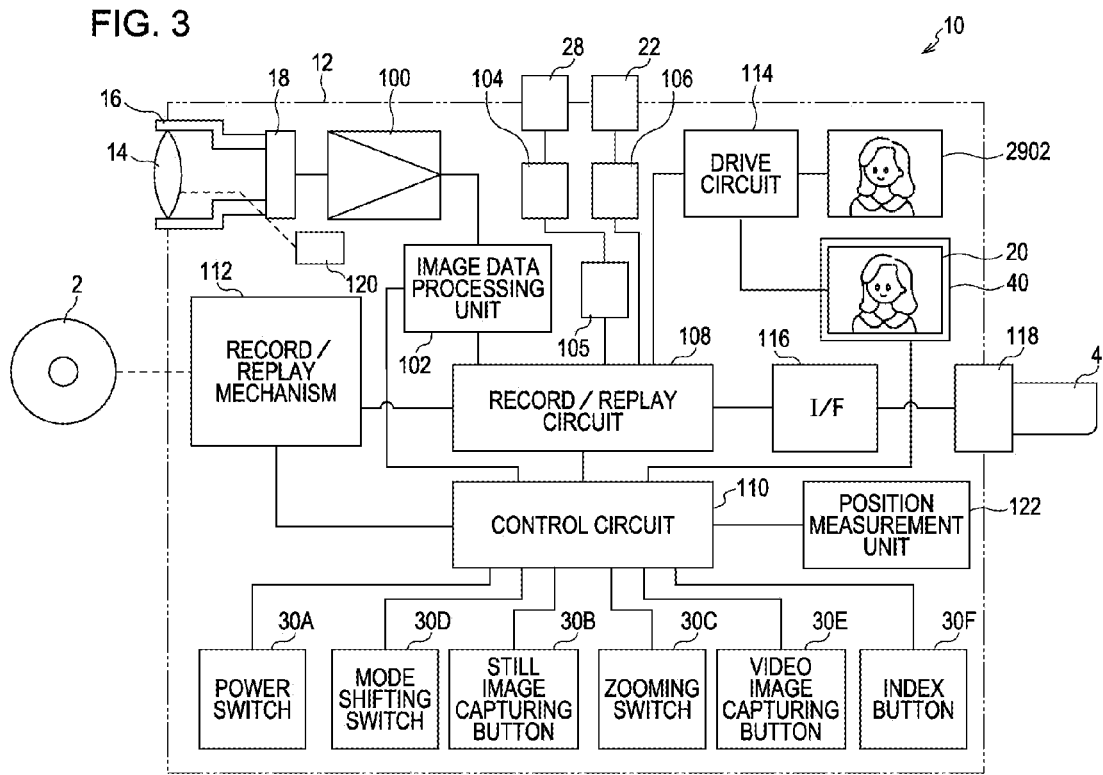
FIG. 3 is a block diagram illustrating a hardware configuration of the imaging device according to the first embodiment of the invention.

First, the description will be made of the configuration of the imaging device according to the first embodiment of the invention with reference to FIGS. 1 to 3. FIGS. 1 and 2 are perspective views illustrating the external configurations on the front and back sides of the imaging device 10 according to this embodiment of the invention, and FIG. 3 is a block diagram illustrating a hardware configuration of the imaging device 10 according to this embodiment of the invention.

As shown in FIGS. 1 and 2, the imaging device 10 according to the embodiment of the invention is implemented as, for example, a digital video camera, and has functions of capturing and recording video images. However, the application of the imaging device according to the embodiment of the invention is not limited to the video camera, and the imaging device can be applied to any electronic apparatuses which can record video images of objects sequentially captured such as a digital still camera having a video image capturing function, a mobile phone, a PDA (Personal Digital Assistant), a mobile movie/music player, a game console, and the like.

A case 12 constituting the external package of the imaging device 10 has longer dimensions in longitudinal (front and back) and height (upper and lower) directions than a width dimension in a right and left direction. In this specification, the terms "right" and "left" are used to represent the right and the left of the imaging device 10 when it is seen from the back side thereof. In addition, the terms "front" and "back" are used to represent the side of an object and the side of an imaging element in an optical axis direction of an imaging optical system, respectively.

In an upper front portion of the case 12, a lens barrel 16 with an imaging optical system 14 incorporated therein extends in the front and back direction, and the front portion of the lens barrel 16 is provided so as to project from the front face of the case 12. The rear end of the lens barrel 16 is provided with an imaging element 18 for capturing the image of the object, which is guided by the imaging optical system 14 (refer to FIG. 3).

As shown in FIG. 1, a display panel 20 is provided on the left side portion of the case 12 so as to be openable and closable, and accommodated in an accommodating concave portion 1202 when closed. The display panel 20 is one of the examples of a display unit for displaying images captured by the imaging element 18, and can be constituted by an LCD (Liquid Crystal Display), an organic EL (Electro Luminescence) display, or the like. Furthermore, a bottom wall of the accommodating concave portion 1202 is provided with a speaker 22 for outputting replayed audio data (refer to FIG. 3).

As shown in FIG. 2, a grip belt 26 is provided to extend in the front and back direction on the right side of the case 12. Furthermore, a right side portion of the case 12 is provided with an accommodating portion 24 which detachably accommodates a disc shaped recording medium 2 (refer to FIG. 3) for recording image data and audio data, and the accommodating portion 24 is opened and closed by an opening/closing cover 2402. The disc shaped recording medium 2 is an optical disc such as a Blu-ray Disc, a DVD (Digital Versatile Disc), a CD (Compact Disc), or the like. In addition to the above mentioned optical discs, the recording medium for recording the captured images may be another arbitrary removable disc such as a magneto-optical disc, a semiconductor memory such as a memory card 4 (refer to FIG. 3), or the like. Alternatively, the recording medium may be a built-in type recording medium such as a hard disc built into the imaging device 10.

In addition, the upper front portion of the case 12 is provided with a microphone 28 for collecting sounds. The upper back portion of the case 12 is provided with an electronic viewfinder 29 with a small-sized display device 2902 incorporated therein (refer to FIG. 3). Furthermore, a battery 25 is detachably provided on the back lower side of the case 12.

Moreover, as shown in FIGS. 1 and 2, the imaging device 10 is provided with a power switch 30A, a still image capturing button 30B, a zooming switch 30C, a mode shifting switch 30D, a video image capturing button 30E, an index button 30F, and the like as operating units for instructing the execution of the various functions regarding imaging. The video image capturing button 30E is an operating tool used by a user for instructing the imaging device 10 to start and complete the recording of the captured video image, and it functions as both a recording start button and a recording completing button. The imaging device 10 starts the recording operation when the user presses the video image capturing button 30E after deciding the composition of an object to be captured. In addition, the imaging device 10 stops the recording operation when the user presses the video image capturing button 30E again. In this regard, the recording operation means an operation for recording image data (a video image constituted by a plurality of frames) sequentially captured by the imaging element 18, in a recording medium.

Next, an internal configuration of the imaging device 10 will be described in detail with reference to FIG. 3. As shown in FIG. 3, the imaging device 10 includes the case 12, the imaging optical system 14, the lens barrel 16, the imaging element 18, the display panel 20, the speaker 22, the microphone 28, and the various operating units 30A to 30F as described above. Furthermore, the imaging device 10 includes a touch panel 40, a movie signal amplification circuit 100, an image data processing unit 102, a microphone amplification circuit 104, an audio data processing circuit 105, an output amplification circuit 106, a record/replay circuit 108, a control circuit 110, a record/replay mechanism 112, a drive circuit 114, an interface circuit 116, a memory card slot 118, a zoom driving unit 120, and a position measurement unit 122.

The imaging optical system 14, the lens barrel 16, the imaging element 18, and the zoom drive unit 120 function as an imaging unit 200 (refer to FIG. 4) for imaging the object and outputting an imaging signal. The imaging optical system 14 includes various lenses such as a focusing lens, a zoom lens, and the like and optical components such as an optical filter for removing unnecessary waveforms, a diaphragm, and the like. The light incident from the object is guided to the imaging element 18 through respective optical components in the imaging optical system 14. The imaging element 18 is constituted by a solid state imaging element such as a CCD (Charge Coupled Device), a CMOS (Complementary Metal Oxide Semiconductor), or the like. This imaging element 18 photoelectric-converts the light guided through the imaging optical system 14, and outputs an imaging signal (an analog movie signal) representing the captured object image.

The movie signal amplification circuit 100 and the image data processing unit 102 function as an image processing unit 210 (refer to FIG. 4) for processing the imaging signal generated by the imaging unit and generating image data. The imaging signal generated by the imaging element 18 is amplified by the movie signal amplification circuit 100, and supplied to the image data processing unit 102. The image data processing unit 102 generates image data (video image data or still image data) by performing a predetermined signal processing on this imaging signal, and supplies the image data to the record/replay circuit 108. The predetermined signal processing includes, for example, the CDS (Correlated Double Sampling) processing, the analog signal processing such as a gain processing by a PGA (Programmable Gain Amplifier) and the like, the digital signal processing such as an A/D converting processing, a gamma correction processing, a white balance processing, and the like.

In addition, the audio signal collected by the microphone 28 is amplified by the microphone amplification circuit 104, subjected to a predetermined signal processing by the audio data processing circuit 105, and supplied to the record/replay circuit 108 as audio data.

The record/replay circuit 108 and the record/replay mechanism 112 function as a record/replay unit 220 (refer to FIG. 4) for recording various data such as image data, audio data, and the like in a recording medium and replay the various data recorded in the recording medium. The record/replay circuit 108 controls the record/replay mechanism 112 based on the instruction of the control circuit 110, records data in a disc shaped recording medium 2, and replays data from the disc shaped recording medium 2.

For example, the record/replay circuit 108 follows the control of the control circuit 110, and supplies the image data (video image data or still image data) supplied from the image data processing unit 102 and the audio data supplied from the audio data processing circuit 105 to the record/replay mechanism 112. Then, the record/replay mechanism 112 records the video image data, the still image data, and the audio data in a disc shaped recording medium 2.

Furthermore, the record/replay circuit 108 records the video image data/the still image data supplied from the image data processing unit 102 and the audio data supplied from the audio data processing circuit 105, in a memory card 4 mounted on the memory card slot 118 through the interface circuit 116.

Moreover, the record/replay circuit 108 is controlled by the control circuit 110, supplies the video image data/the still image data supplied from the image data processing unit 102 to the display panels 20 and 2902 through the drive circuit 114, and causes them to display the image.

In addition, the record/replay circuit 108 supplies the video image data/the still image data, which is supplied from the memory card 4 through the interface circuit 116, to the display panels 20 and 2902 through the drive circuit 114, and causes the display panels to display the images. Furthermore, the record/replay circuit 108 supplies the audio data, which is supplied from the memory card 4 through the interface circuit 116, to the speaker 22 through the output amplification circuit 106, and causes the speaker 22 to output the sound.

Moreover, the record/replay circuit 108 supplies the video image data or the still image data, which is replayed from the disc shaped recording medium 2 by the record/replay mechanism 112, to the display panels 20 and 2902 through the drive circuit 114, and causes the display panels to display the image. Furthermore, the record/replay circuit 108 supplies the audio data, which is replayed from the disc shaped recording medium 2 by the record/replay mechanism 112, to the speaker 22 through the output amplification circuit 106, and causes the speaker 22 to output the sound.

The display panels 20 and 2902 function as display units for displaying various image data (video image data or still image data) supplied as described above. For example, the display panels 20 and 2902 display the video image (the live-view image) input from the record/replay circuit 108 in real time while the image is captured. Accordingly, it is possible for a user to perform imaging operations (such as a zooming operation, a recording start instruction, a recording completing instruction, an index instruction input operation, and the like) while viewing the video image being captured by the imaging device 10, and image the desirable object in a desirable composition. In addition, when the video image recorded in the recording medium 2 or 4 is replayed by the record/replay circuit 108, a display 130 displays the replayed image input from the record/replay circuit 108. With this configuration, it is possible for the user to confirm the contents of the video image recorded in the recording medium 2 or 4.

The touch panel 40 functions as a position detecting unit for detecting a position on a display screen of the display panel 20, which an operating body touches or approaches. The touch panel 40 is disposed so as to be overlapped on the display panel 20, and includes a sensor for detecting a position on the display screen, which the operating body touches or approaches. With this configuration, the touch panel 40 can detect a position on the display screen, which was designated by the operating body, and a movement track and a movement speed of the operating body. The operating body used for the operation of the touch panel 40 is, for example, a finger of the user, a stylus, a touch pen, or the like. The touch panel 40 detects as a coordinate, the position on the display screen, which the operating body touches or approaches, and the coordinate detected by the touch panel 40 is transferred to the control circuit 110 to be subjected to a predetermined processing.

An arbitrary kind of touch panel such as a pressure sensitive touch panel, an electrostatic touch panel, or an optical touch panel can be used as the touch panel. The pressure sensitive touch panel detects a variation in pressure when the panel is pressed by the operating body. The electrostatic touch panel detects an electrical signal through the electrostatic caused when the operating body touches the panel. The optical touch panel is provided with an optical sensor on the outer frame of the display panel, which generally detects the position and the moving direction of the operating body touching the panel. There is another type of optical sensor such as an in-cell optical touch panel. The in-cell optical touch panel includes a display panel with an optical sensor array mounted thereon, and the optical sensor array detects the position and the movement track of the operating body which touches or approaches the display panel.

In addition, a contact type touch panel which detects a contact of the operating body (for example, the above-mentioned pressure sensitive or electrostatic touch panel) is generally used as a touch panel 40. A user can perform the various operations on the imaging device 10 by pressing the screen of the touch panel 40 with a finger, a stylus, or the like, and moving the finger or the stylus pressing the screen.

In this regard, there is also a non-contact type touch panel which can recognize the operating body which approaches the touch panel, even if the operating body is not in direct contact with the touch panel. This non-contact type touch panel can be implemented by the above-mentioned optical touch panel. Hereinafter, although the description will be made of the example of the contact type touch panel 40 for detecting a contact position of the operating body (for example, a finger) for conciseness, the position detecting unit according to the embodiment of the invention can be implemented by a non-contact type touch panel, or other screen position detecting devices.

The control circuit 110 functions as a control unit 230 (refer to FIG. 4) for controlling each part of the imaging device 10. The control circuit 110 includes, for example, a CPU (Central Processing Unit), an EEPROM (Electrically Erasable Programmable ROM), a ROM (Read Only Memory), and a RAM (Random Access Memory). The ROM in the control circuit 110 stores a program for executing the various control processings of the control circuit 110. The CPU operates based on the program, and executes a computation and the control processing necessary for the above-mentioned various controls while using the RAM. This program can be stored in advance in a recording medium (for example, the ROM) built in the imaging device 10. Furthermore, the program may be stored in a removable recording medium and provided to the imaging device 10, or may be downloaded to the imaging device 10 through a network such as the LAN and Internet.

The description will be made of an example of control by the control circuit 110 hereinafter. The control circuit 110 turns on and off the power source of the imaging device 10 based on the user's operation on the power switch 30A.

In addition, the control circuit 110 instructs the image data processing unit 102 and the record/replay circuit 108, based on the user's operation on the still image capturing button 30B, to supply the still image data, which is supplied from the image data processing unit 102, to the record/replay mechanism 112 through the record/replay circuit 108. Then, the control circuit 110 causes the disc shaped recording medium 2 to record the still image data. As described above, the still image capturing button 30B functions as a so-called shutter button for capturing and recording the still image.

The control circuit 110 instructs the zoom driving unit 120, based on the user's operation on the zooming switch 30C, to cause the movable lens (not shown) of the imaging optical system 14 to move and thereby to change the zoom rate of the imaging optical system 14.

In addition, the control circuit 110 instructs the image data processing unit 102, based on the operation on the mode shifting switch 30D, to shift between a video image capturing mode for generating the video image data by the image data processing unit 102 and a still image capturing mode for generating the still image data by the image data processing unit 102. In this regard, the video image data generated by the image data processing unit 102 is recorded in the disc shaped recording medium 2 or the memory card 4 through the record/replay circuit 108 in the video image capturing mode, and the still image data generated by the image data processing unit 102 is recorded in the disc shaped recording medium 2 or the memory card 4 through the record/replay circuit 108 in the still image capturing mode. Moreover, the control circuit 110 can shift a mode to a replay mode for replaying the recorded images, in addition to the above-mentioned two imaging modes.

In addition, the control circuit 110 starts and completes the recording of the video image data by the imaging device 10 based on a user's first operation on the video image capturing button 30E. That is, the control circuit 110 instructs, based on the user's operation (an instruction for starting the recording of the video image) on the video image capturing button 30E, the image data processing unit 102 and the record/replay circuit 108 to supply the video image data, which is supplied from the image data processing unit 102, to the record/replay mechanism 112 through the record/replay circuit 108 and thereby to start the operation for recording the video image data in the disc shaped recording medium 2 (to start the recording operation). Furthermore, the control circuit 110 stops the recording operation (to complete the recording operation) based on a user's second operation (an instruction for completing the recording of the video image) on the video image capturing button 30E. As described above, the video image capturing button 30E functions as an operating member (an operating unit for starting and completing the recording operation) for a user to instruct the imaging device 10 to start and complete the recording of the video image. In the imaging device 10 according to the embodiment of the present invention, a single operating member (the video image capturing button 30E) functions as both the operating unit for starting the recording operation and the operating unit for completing the recording operation. However, these two operating units may be implemented by two different operating members.

Moreover, the control circuit 110 sets an index section in the video image based on the user's operation (an instruction for an index) on the index button 30F during the recording period from the instruction for the start of the recording operation to the instruction for the completion of the recording operation. Then, the control circuit 110 generates index information representing the set index section, and associates and records the index information with the video image data. The index button 30F functions as an operating member (an index operating unit) for inputting the instruction for the index by the user.

The index information is time information representing a predetermined time period including an arbitrary time point which is designated by the user while the video image is captured and recorded (during the recording time period). For example, a user presses the index button 30F in an exciting scene (for example, a scene of a home run in a baseball game) or a favorite scene (for example, a scene of a smiling child) while the video image is captured, and inputs the instruction for the index. The imaging device 10 sets as the index section, a section of the video image captured in the predetermined time period including a time point of inputting the instruction for the index, and records the index information thereof. The index operating unit may be implemented by a dedicated physical operating tool such as the index button 30F, or may be implemented by a GUI (Graphical User Interface) component displayed on the display screen of the display panel 20.

The position measurement unit 122 has functions of measuring a current position of the imaging device 10 and generating imaging position information which represents a position where the video image is captured. The position measurement unit 122 includes, for example, a GPS (Global Positioning System) sensor, an angular velocity sensor, an acceleration sensor, a magnetic sensor, and the like. The position measurement unit 122 measures a position (a longitude, a latitude, or the like) and a posture of the imaging device at the time of capturing the video image while using these various sensors, and thus generates the imaging position information representing the imaging position at the time of capturing the video image.

For example, the GPS sensor measures a current position (a longitude and a latitude) of the imaging device 10 by receiving radio waves from a plurality of GPS satellites and calculating distances from each of the GPS satellites. The angular velocity sensor and the acceleration sensor respectively detect the angular velocity and the acceleration when the imaging device 10 moves while the video image is captured. The magnetic sensor detects the direction of the imaging device 10 by detecting a magnetic field around the imaging device 10. The position measurement unit 122 acquires the position of the imaging device 10 (that is, the imaging position) at the time of capturing the video image by analyzing the measurement data such as the current position of the imaging device 10 detected in the above-mentioned manner, the angular velocity, the acceleration, the variation in the Earth's magnetic field, and generates the imaging position information representing the imaging position.

The control circuit 110 controls the record/replay circuit 108 and the like to associate the imaging position information generated by the position measurement unit 122 with a frame in the video image captured at the imaging position and stores the imaging position information in a recording medium. For example, the position measurement unit 122 measures the imaging position at a predetermined time interval (for example, every few seconds or every few minutes) while the video image is captured (during the recording time period), and generates the imaging position information representing the imaging position. This imaging position information is associated with the frame position information of the video image, and stored in a recording medium such as a memory. The frame position information represents the position of each frame composing the video image, and includes a time of imaging, a time code, a number of frames from the beginning frame of the video image, or a time from the beginning of the video image, for example.

In addition, the control circuit 110 controls the record/replay mechanism 112, the record/replay circuit 108, the drive circuit 114, and the like to generate a plurality of thumbnail images from the video image captured during the recording time period. The control circuit 110 causes the display panel 20 to display the record confirmation screen including a display object representing the above-mentioned index section and the thumbnail images immediately after capturing the video image (that is, immediately after the instruction for the completion of the recording operation). This record confirmation screen is an auto review screen (Rec_Review screen) for confirming the index section set in the recorded video image immediately after the completion of the recording of the video image, and the detailed description thereof will be made later.

[Functional Configuration of Imaging Device]

Next, the description will be made of the functional configuration of the imaging device 10 according to the embodiment of the invention with reference to FIG. 4. FIG. 4 is a block diagram illustrating the functional configuration of the imaging device 10 according to the embodiment of the invention.

As shown in FIG. 4, the imaging device 10 includes the imaging unit 200, the image processing unit 210, the record/replay unit 220, the control unit 230, the display panel 20, the various operating units 30A to 30F, the touch panel 40 as another operating unit, and the position measurement unit 122. The control unit 230 includes an imaging control unit 232, a display control unit 234, an index setting unit 236, a memory 238, an object recognition unit 240, and a function control unit 242. Each of the functional units of the imaging device 10 will be explained in the following description.

The imaging unit 200 is constituted by a drive circuit including, for example, the imaging optical system 14, the lens barrel 16, the imaging element 18, the zoom driving unit 120, and the like which are shown in FIG. 3. The imaging unit 200 is controlled by the imaging control unit 232, captures an optical image of the object by the imaging element 18, and outputs an imaging signal representing the image obtained by capturing the optical image.

The image processing unit 210 includes, for example, the movie signal amplification circuit 100, the image data processing unit 102, and the like shown in FIG. 3. The image processing unit 210 is controlled by the imaging control unit 232, performs a predetermined processing on the imaging signal, and thereby generates the video image constituted by data of a plurality of images. The video image is constituted by the video image frames which are sequentially generated at a predetermined time interval (for example, 1/60 seconds).

The record/replay unit 220 includes, for example, the record/replay circuit 108 and the record/replay mechanism 112 shown in FIG. 3, records various data in the disc shaped recording medium 2, and replays the various data from the disc shaped recording medium 2. For example, the record/replay unit 220 is controlled by the imaging control unit 232, records the video image input from the image processing unit 210 in the disc shaped recording medium 2, and replays the video image recorded in the disc shaped recording medium 2. In addition, the record/replay unit 220 records the thumbnail images generated from the video image by the display control unit 234 in the disc shaped recording medium 2, and replays the thumbnail images recorded in the disc shaped recording medium 2.

The control unit 230 includes, for example, the control circuit 110 shown in FIG. 3, and controls each unit of the imaging device 10. A processor of the control circuit 110 executes a computer program for implementing each function which will be described later, and each functional unit shown in FIG. 4 can be implemented.

The imaging control unit 232 controls the imaging operations of the imaging device 10. That is, the imaging control unit 232 controls the imaging unit 200, the image processing unit 210, and the record/replay unit 220 as described above in response to the user's operation on each of the operating units 30A to 30E to cause the imaging unit 200, the image processing unit 210, and the record/replay unit 220 to execute the imaging processing for the video image or the still image, the record processing, and the replay processing. For example, when a user presses the video image capturing button 30E and inputs the instruction for the start of the record operation, the imaging control unit 232 controls the record/replay unit 220, and starts to record the video image generated by the imaging unit 200 and the image processing unit 210 in the disc shaped recording medium 2 (the starting operation of the recording). Meanwhile, when the user presses the video image capturing button 30E again and inputs the instruction for the completion of the recording operation, the imaging control unit 232 controls the record/replay unit 220, and completes the recording of the video image (the completing operation of the recording).

The imaging control unit 232 can shift the operation mode of the imaging device 10 to the video image capturing mode, the still image capturing mode, or the replay mode in response to the user's operation on the mode shifting switch 30D. In the video image capturing mode and the still image capturing mode, the imaging processing by the imaging unit 200 and the image processing by the image processing unit 210 are continuously performed, and the video image which is being captured and obtained by the above processing (hereinafter, also referred to as a captured image) is displayed on the display panel 20 as a live-view screen. The user determines the composition of the object and a shutter chance while viewing the live-view screen of the captured image, and inputs the instruction for the recording of the video image or the still image to the imaging device 10. In the video image capturing mode, the video image data which is captured and subjected to the image processing during the recording time period is recorded in the disc shaped recording medium 2, the recording time period being a period from the instruction for the start of the recording to the instruction for the completion of the recording by the video image capturing button 30E. In the still image capturing mode, the still image data which is captured and subjected to the image processing at the timing of a release instruction in response to the release instruction is recorded in the disc shaped recording medium 2, the release instruction being made when the user presses the still image capturing button 30B (a so-called shutter button).

The display control unit 234 controls the display panel 20 to cause the display panel 20 to display the various images and data. For example, the display control unit 234 causes the display panel 20 to display the live-view screen of the captured image in real time while the video image is captured.

The live-view screen is a screen for displaying the captured images which can be obtained by the imaging processing by the imaging unit 200 and the image processing by the image processing unit 210. It is possible for the user to decide the composition of the object and determine the timing for start and completion of the recording, the timing for adding the index by viewing the live-view screen on the display panel 20, and the like in real time.

In addition, the display control unit 234 causes the display panel 20 to automatically display the record confirmation screen of the video image immediately after recording the video image. The record confirmation screen is an auto review screen which is automatically displayed on the display panel 20 of the imaging device 10 immediately after the completion of the recording of the video image (that is, immediately after the instruction for the completion of the recording operation is input). This record confirmation screen includes the replayed image of the recorded video image, the thumbnail images of the video images, and the like. The thumbnail images are the still images extracted from the video image recorded during the recording time period. This record confirmation screen has both the auto review function for showing the outline of the recorded video image immediately after the recording and the image operating function for executing predetermined functions (such as a replay, a deletion, a rating, and the like) on the video image immediately after the recording. The display of such a record confirmation screen makes it possible for the user to confirm the contents of the recorded video image immediately after the recording of the video image, thereby to edit the video image.

The index setting unit 236 sets the index section of the video image while the video image is captured (during the recording time period) in response to one user's operation on the index operating unit. Then, the index setting unit 236 generates index information representing the set index section, associates the index information with the video image, and stores the associated index information in the memory 238. The index information functions as an index to be added to the exciting scene or the favorite scene in the video image.

As described above, the user operates the index operating unit in the exciting scene or the favorite scene during capturing of the video image (during the recording time period). This user's operation may be pressing of the index button 30F, tapping of the GUI component (for example, an index icon 306 shown in FIG. 5) displayed on the live-view screen of the display panel 20, or the like. The user can input the instruction for the index to the imaging device 10 with such an operation. Then, the index setting unit 236 sets a predetermined time period including the input time point of the instruction for the index in response to the user's input of the instruction for the index, and sets as an index section, a section of the video image constituted by a plurality of frames captured in the above-mentioned predetermined time period. Subsequently, the index setting unit 236 generates the index information including the time information (for example, a time representing the start point and the last point of the index section, a time code, or a time or a number of frames from the beginning of the video image) representing the set index section. Furthermore, the index setting unit 236 associates the generated index information with the video image, and stores the associated index information in a recording medium such as the memory 238.

As described above, the index setting unit 236 sets the index section constituted not by a time point in the video image but by a predetermined section of the video image while the video image is captured in response to one user's operation on the index operating unit, and stores the index information representing the index section. As a result, it is possible to add an index to the section in the video image corresponding to the time point designated by the user while using the arbitrary time point designated by the user as a reference. Accordingly, it is possible to add to the video image being captured, an index for specifying the exciting scene or the favorite scene, and thereby to make the scene designated by the user while the video image is captured be identifiable as a special scene. The index information generated while the video image is captured in this manner is useful as an index at the time of replaying or editing the video image later.

In addition, the index setting unit 236 can change the time or the position of the index section to be set in response to the user's operation on the display screen, which is detected by the touch panel 40. For example, when the user's finger slides on the display screen of the display panel 20 while the video image is captured, the touch panel 40 detects the sliding method (for example, the sliding length or the sliding direction). Then, the index setting unit 236 sets the index section in accordance with the sliding method detected by the touch panel 40. In addition, the sliding direction is a direction in which the operating body slides on the display screen, and the sliding length is a length by which the operating body slides on the display screen.

Specifically, the index setting unit 236 sets the index section in accordance with the sliding direction by the operating body. For example, when the operating body slid on the display screen in a first direction (for example, a right direction or an upper direction), the index setting unit 236 sets a section of the frames, which are captured during the predetermined time period after the time point at which the operating body slid on the display screen, as the index section. On the contrary, when the operating body slid on the display screen in a second direction (for example, a left direction or a lower direction), the index setting unit 236 sets as the index section, a section of the frames which are captured during the predetermined time period before the time point at which the operating body slid on the display screen.

Moreover, the index setting unit 236 sets the index section in accordance with the sliding length of the operating body. For example, the index setting unit 236 decides the time length of the index section in accordance with the sliding length of the operating body. In addition, the index setting unit 236 decides the time corresponding to the sliding length of the operating body, sets as a start point, the time point preceding the time point at which the operating body slides on the display screen by the above-mentioned time, and sets as the index section, the section of the video image captured after the start point.

As described above, the user can easily designate the position and the time length of the desirable index section by the direction or the length of sliding on the display screen. The method for setting the index section in accordance with the sliding on the display screen by the user will be described later in detail.

The object recognition unit 240 analyzes the video image being captured, and thereby recognizes an object 340 being displayed on the live-view screen 300 of the video image, that is, the object 340 included in a captured image 302 being currently captured. Here, the object is an arbitrary object included in the captured image which is captured by the imaging device 10, and may be an arbitrary thing such as a person, an animal, a plant, a vehicle, a building. For example, when the user images a dog with the imaging device 10, the dog is the object. An arbitrary object recognition technique in the related art can be employed as a method in which the object recognition unit 240 recognizes the object.

Figure 12:
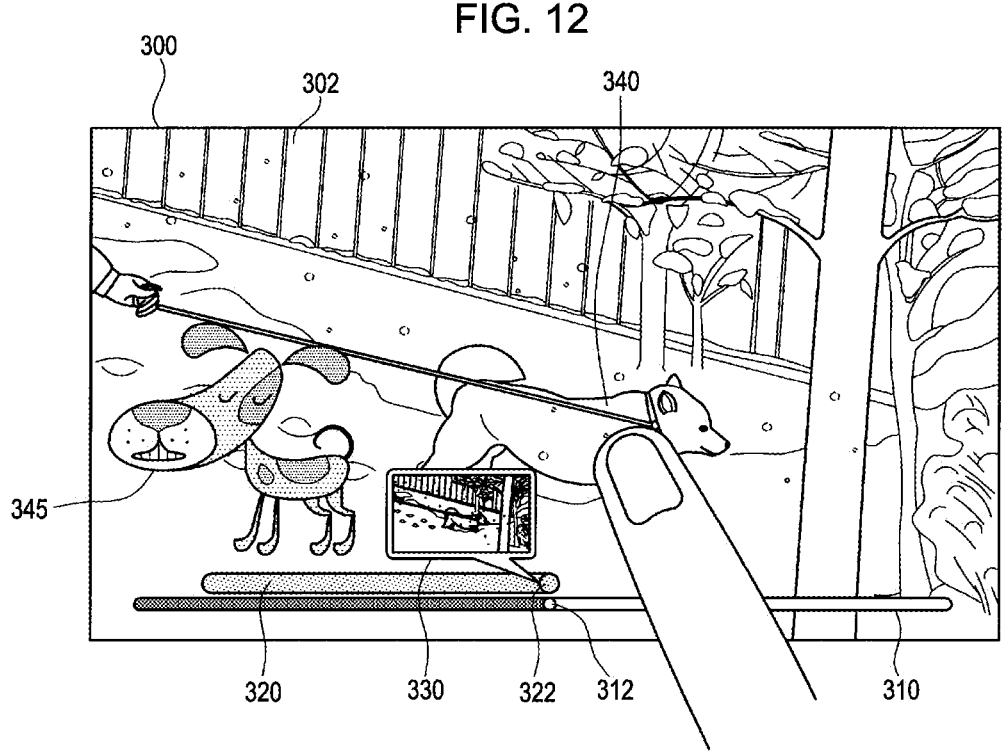
FIG. 12 is a diagram illustrating a display example of a live-view screen according to a second embodiment of the invention.

The object recognition unit 240 recognizes the object 340 being displayed in a position on the display screen, which is designated by the user, while the video image is captured (refer to FIG. 12). More specifically, if the user designates an arbitrary position on the live-view screen 300 using the operating body while the video image is captured, the touch panel 40 detects the position on the live-view screen 300, which is designated by the operating body. Such a user's designating operation with respect to the live-view screen 300 corresponds to the instruction for the index. The object recognition unit 240 recognizes the object 340 appearing in the designated position on the live-view screen 300 in response to such an instruction for the index, and specifies the section of the video image constituted by a plurality of frames in which the object 340 appears. The index setting unit 236 sets as the index section, the section of the video image constituted by the plurality of frames in which the object recognized by the object recognition unit 240 appears. By using the object recognition and setting the index section as described above, the user can add an index to the section of the video image in which the desirable object 340 appears, with a simple operation of designating the object 340 on the live-view screen 300.

The description was made of the method for setting the index section by the index setting unit 236 hitherto. The display control unit 234 causes the display panel 20 to display the information representing the index section set by the index setting unit 236. For example, while the video image is captured, the display control unit 234 causes the display panel 20 to display a display object 320 representing the index section set while the video image is captured, on the live-view screen 300 while making a correspondence relationship between the display object 320 and the time axis of the recording time of the video image (refer to FIG. 5). Furthermore, the display control unit 234 may display a thumbnail image 330 captured at an arbitrary point in the index section (for example, at a time point of inputting the instruction for the index, or the start or last point of the index section) on the live-view screen 300. In this manner, the display control unit 234 displays the display object 320 representing the index section on the live-view screen 300 while the video image is captured. As a result, the user can confirm in real time the time length and the position of the index section set while the video image is captured. The description will be made later regarding the display of the index section while the video image is captured (refer to FIG. 5).

In addition, the display control unit 234 causes the display panel 20 to display the record confirmation screen 400 immediately after the completion of the recording of the video image (refer to FIG. 7). When the record confirmation screen 400 is displayed, the display control unit 234 causes the display object 420, which represents the index section set while the video image is captured, to be displayed on the record confirmation screen 400 while making a correspondence relationship between the display object 420 and the time axis of the recording time of the video image. This display object 420 is displayed based on the index information stored in the memory 238. In addition, the display control unit 234 may display on the record confirmation screen 400, the thumbnail images 430 captured at an arbitrary point in the index section (for example, at a time point of inputting the instruction for the index, or the start or last point of the index section). By displaying the display object 420 indicating the index section on the record confirmation screen 400 after the completion of the recording, the user can confirm after the recording, the time length and the position of the index section which is added to the video image while the video image is captured, and adjusts the index section on the record confirmation screen 400. The description will be made later regarding the display and the adjustment of the index section after the completion of the recording of the video image (refer to FIG. 8 and the like).

In addition, when the display control unit 234 displays the thumbnail images 330 and 430 on the live-view screen 300 or the record confirmation screen 400, the display control unit 234 generates a thumbnail image as a representative of one or not less than two index sections set in the video image based on the index information stored in the memory 238. At this time, the display control unit 234 may specify a frame corresponding to an arbitrary point (for example, the start or last point of the index section, or the time point of inputting the instruction for the index) in the index section represented by the index information, and extract the frame as a thumbnail image 330 or 430 which is the representative of the index section.

The function control unit 242 controls the record/replay unit 220 and the like, and executes predetermined functions with respect to the recorded video image. This function control unit 242 executes the predetermined functions with respect to a section or whole section of the video image based on the user's operation on the touch panel 40. The predetermined functions are the arbitrary functions which can be executed with respect to the image data of the video image, and are the functions such as a deletion of at least a section of the video image, a replay, an addition of an evaluation value (that is, a rating), a creation of a play list, and the like. The function control unit 242 may perform these predetermined functions with respect to the whole section of one recorded video image, or may perform these functions with respect to a section of the video image. As described above, the function control unit 242 functions as a deletion unit, a replay unit, a rating unit, a play list creating unit, and the like.

The function control unit 242 executes predetermined functions with respect to the video image recorded in the recording medium 2 in response to the user's operation on the record confirmation screen 400 immediately after the completion of the recording. For example, there is a case in which a user designates a deletion icon 450C (refer to FIG. 7) from among one or not less than two functional icons 450 displayed on the record confirmation screen 400 while the record confirmation screen 400 is displayed. In this case, the touch panel 40 detects the user's operation with respect to the deletion icon 450C displayed on the record confirmation screen 400. The function control unit 242 deletes the sections other than the index section in the video image recorded in the recording medium 2 in response to the user's operation on the deletion icon 450C. At this time, the function control unit 242 can specify the image sections other than the index section in the video image based on the index information in the memory 238. In this manner, the user can execute the functions such as the deletion, the replay, the rating, and the like with respect to the video image immediately after the completion of the recording by selecting a desirable functional icon in the record confirmation screen 400 using the touch panel 40.

In addition, the function control unit 242 executes predetermined functions with respect to the video image being captured and recorded in response to the user's operation on the live-view screen 300 being captured. For example, when the video image was added with the index section while captured, the function control unit 242 automatically deletes the section of the video image, which was captured before the index section in the video image recorded in the recording medium 2. As a result, the imaging device 10 can automatically delete unnecessary sections of the video image before the index section only by the user's operation of adding the index section to a necessary section of the video image while the video image is captured.

[Display Example of Live-View Screen]

Next, referring to FIG. 5, the description will be made of the display example of the live-view screen 300, which is displayed while the video image is captured, according to the embodiment of the present invention. FIG. 5 is a diagram illustrating the display example of the live-view screen 300 according to the embodiment of the present invention.

As shown in FIG. 5, the live-view screen 300 is displayed on the display screen of the display panel 20 while the video image is captured by the imaging device 10 (during the recording time period). The live-view screen 300 is a screen for displaying the image being currently captured (that is, the captured image 302) by the imaging device 10 in real time. The index icon 306 is displayed on the captured image 302 in the live-view screen 300. The index icon 306 is a GUI button for adding an index to the video image while the video image is captured, and has a similar function as that of the above-mentioned physical index button 30F. By tapping the index icon 306 on the live-view screen 300 at an arbitrary time point while the video image is captured, the user can input the instruction for the index to the imaging device 10, and add the index to the video image at the time point. In this regard, the index icon 306 may be displayed or may not be displayed on the live-view screen 300 depending on the user's setting.

Moreover, a time bar 310, the display objects 320 which represent the index section set while the video image is captured, and thumbnail images 330 are displayed on the lower side of the live-view screen 300 while overlapping on the captured image 302.

The time bar 310 is an example of the display object representing the time axis of the recording time of the video image being captured. The time bar 310 shown in the example of FIG. 5 includes a slider bar with a point shaped slider 312. The slider 312 in the time bar 310 moves from the left to the right in the screen with the passage of the recording time. The position of the slider 312 represents the recording time from the beginning of the video image to the captured image 302 being currently captured (that is, the recording time from the start point of the recording to the current time). The user can know the current recording time of the video image being captured by checking the position of the slider 312 in the time bar 310. In addition, the length of the time bar 310 may be constant to scroll-display the time bar 310 such that the slider 312 representing the current time point is typically positioned in the center of the horizontal direction of the screen. Alternatively, the length of the time bar 310 may be shortened with the passage of the recording time such that the whole part of the time bar 310 is typically displayed in the live-view screen 300.

The display object 320 represents the index section set while the video image is captured. This display object 320 representing the index section (hereinafter, referred to as an index section object 320) is displayed while a correspondence relationship is made between the index part object 320 and the time bar 310 representing the time axis of the recording time of the video image. In the example of the FIG. 5, two index section objects 320A and 320B, which respectively represent the two index sections set while one video image is captured, are displayed on the upper side of the time bar 310. The relative position of the index section object 320 with respect to the time bar 310 represents which position on the time axis of the recording time the index section represented by the index section object 320 corresponds to. The user can know the position and the time length of the index section set while the video image is captured by comparing the index section object 320 and the time bar 310.

In addition, the index section object 320 includes the point 322 representing the time point of the user's inputting of the instruction for the index. This point 322 represents the time point of the user's operation on the index button 30F or the index icon 306 to input the instruction for the index while the video image is captured. It can be seen from the example of FIG. 5, in which two points 322A and 322B are displayed, that the instruction for the index was input twice while one video image was being captured. The user can know the time point at which the index was added to the video image by checking the point 322 in the index section object 320. Furthermore, it can be seen from the example of FIG. 5, in which the points 322A and 322B are disposed on the right ends of the index section objects 320A and 320B, that the time point of inputting the instruction for the index corresponds to the last point of the index section.

The thumbnail image 330 is a still image as a representative of the index section. In addition, the thumbnail image 330 is an image of a frame captured at an arbitrary time point in the index section of the video image (for example, the start point, the last point, or the time point of inputting the instruction for the index). In the example of FIG. 5, the frames of the captured image 302 captured at time points (corresponding to the points 322) of inputting the instructions for the index are used as thumbnail images 330. However, the frame captured at the start or last point of the index section may be displayed as a thumbnail image 330 of the index section. In addition, in the example of FIG. 5, the thumbnail images 330A and 330B are pop-up displayed from the points 322A and 322B, respectively for the two index section objects 320A and 320B. The user can confirm the representative image of the set index section on the live-view screen 300 by checking such a thumbnail image 330.

The description was made of the display example of the live-view screen 300 hitherto with reference to FIG. 5. Next, the description will be made of the operation of the imaging device 10 when the index is added while the video image is captured by the imaging device 10.

As described above, the imaging device 10 is provided with the index operating unit for adding an index at an arbitrary time point in the video image such as an exciting scene or the desirable scene while the video image is captured. This index operating unit is a touch panel 40 and the like which detects the user's operation on the index button 30F and the index icon 306.

The user (the person who captures the image) of the imaging device 10 operates the index operating unit and inputs the instruction for the index to the imaging device 10 when the user feels that the scene being captured is exciting. When the user inputs the instruction for the index, the imaging device 10 sets the index section while using the time point at which the instruction for the index is input as a reference, and records the index information representing the index section in the memory 238. Moreover, the imaging device 10 displays the time bar 310, the index section object 320, and the thumbnail image 330 on the live-view screen 300 displayed on the display panel 20 as shown in FIG. 5. As described above, the time bar 310 represents the time axis of the recording time, the index section object 320 represents the set index section, and the thumbnail image 330 is a captured image 302 at the time point of inputting the instruction for the index.

As described above, in the imaging device 10 according to the embodiment of the invention, the index is added not to one frame captured at the time point of inputting the instruction for the index but to a section constituted by a plurality of frames captured for a predetermined time period including the time point of inputting the instruction for the index. This is because of the following reason. That is, it can be considered that in the case of capturing the video image, the scenes before and after a time point of inputting the instruction for the index are also exciting even if the user inputs the instruction at a time point. For example, when a father wants to image his child's smiling using the imaging device 10, he inputs the instruction for the index after his child smiled. However, the exciting scene in practice (the scene of the child's smiling) starts before the time point at which he inputs the instruction for the index. In such a case, it is preferable to add the index to the image captured before the time point of inputting the instruction for the index.

Therefore, the imaging device 10 according to the embodiment of the invention uses as a reference, the time point at which the user operates the index operating unit once to input the instruction for the index, sets a predetermined time period including the time point, and automatically sets a section of the video image constituted by a plurality of frames captured in the predetermined time period as an index section.

The time length of the index section is set to a predetermined time set in advance (for example, 5 seconds, 10 seconds, 30 seconds, or the like). The imaging device 10 automatically sets the index time period with the predetermined time length while using the time point of inputting the instruction for the index as a reference.

Figure 6A:
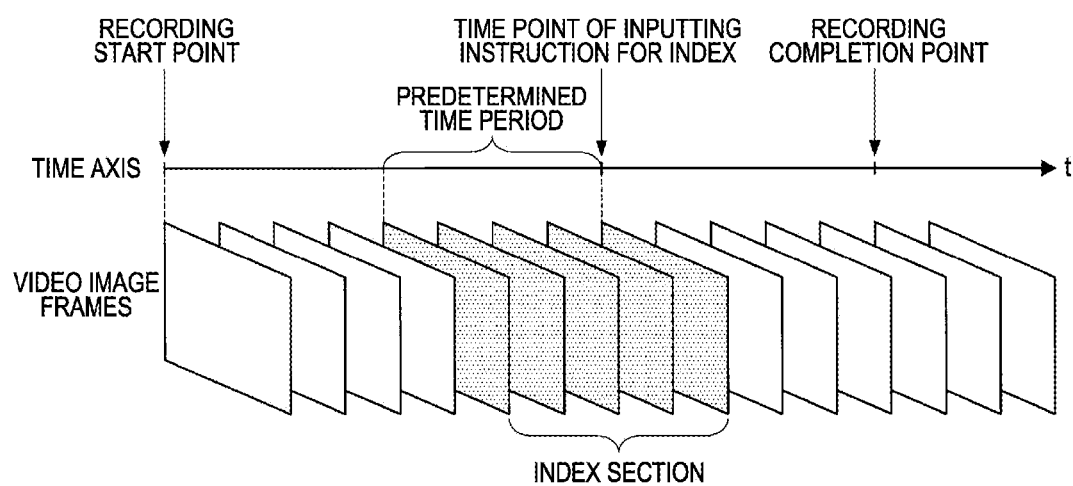
FIGS. 6A to 6C are conceptual diagrams illustrating setting methods of index sections according to the first embodiment of the invention.
Figure 6B:
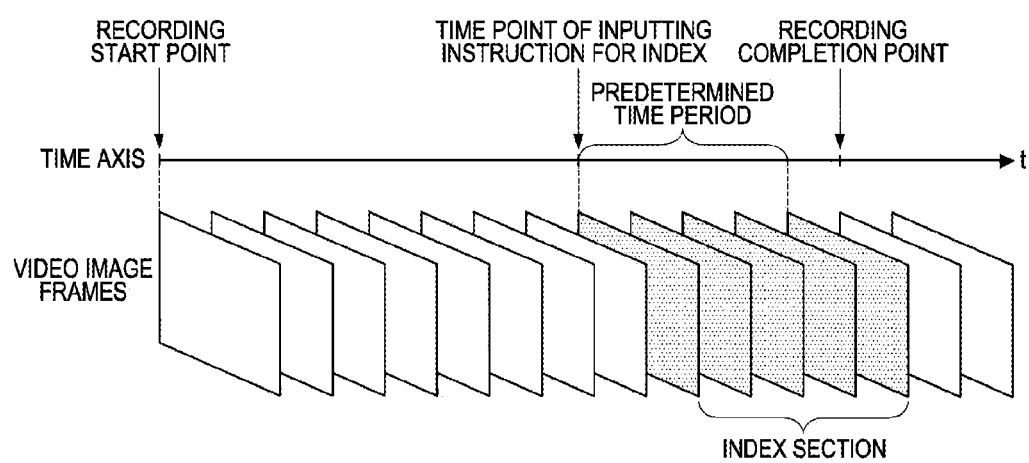
Figure 6C:
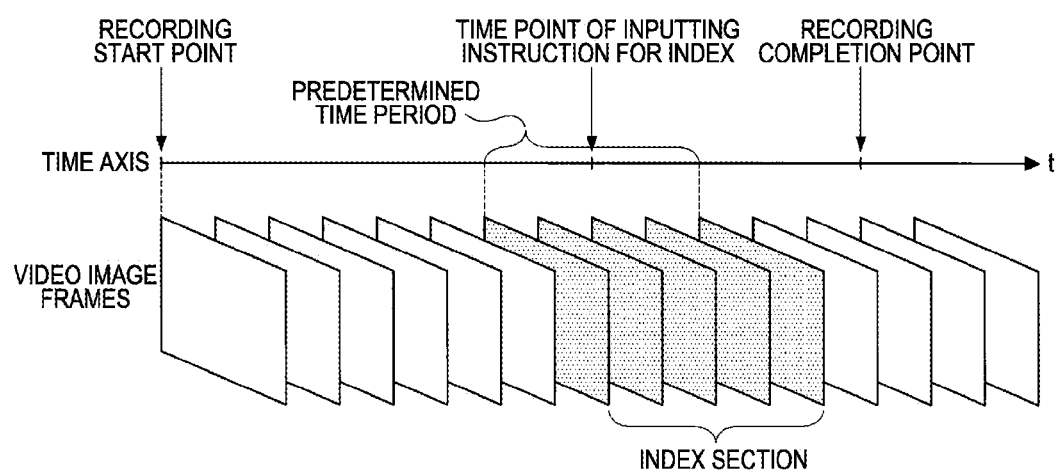

FIGS. 6A to 6C are conceptual diagrams illustrating the method for automatically setting the index section by the imaging device 10 according to the embodiment of the invention. FIGS. 6A to 6C shows examples in which the time length of the index section is fixed to a predetermined time (10 seconds, for example).

In the example shown in FIG. 6A, the imaging device 10 sets index section to the 10 seconds before the time point of inputting the instruction for the index. In this case, the last point of the index section corresponds to the time point of inputting the instruction for the index. This setting method is useful for the case in which the scene already captured before inputting the instruction for the index is the exciting scene.

Moreover, in the example shown in FIG. 6B, the imaging device 10 sets the index section to the 10 seconds after the time point of inputting the instruction for the index. In this case, the start point of the index section corresponds to the time point of inputting the instruction for the index. This setting method is useful for the case in which the exciting scene is captured after inputting the instruction for the index.

In the example shown in FIG. 6C, the imaging device 10 sets the index section to the 10 seconds before and after the time point of inputting the instruction for the index. In this case, the midpoint of the index section corresponds to the time point of inputting the instruction for the index. This setting method is useful for the case in which the exciting scene appears before and after inputting the instruction for the index, and the instruction for the index is input at a peak point in the exciting scene.

As described above, the imaging device 10 according to the embodiment of the present invention handles the index representing the exciting scene in the video image not as a point but as a section. In addition, the imaging device 10 automatically sets the index section while using the time point of inputting the instruction for the index as a reference. With this configuration, when the user operates the index operating unit once, it is possible to automatically set the appropriate index section by the imaging device 10 while using the time point of the user's operation as a reference. Accordingly, the user can use the imaging device 10 handily since it is not necessary to perform several operations for setting the index section. In addition, the user can set in advance the setting method of the index section shown in FIGS. 6A to 6C and the time length of the index section for the imaging device 10.

Furthermore, the index section object 320 indicating the index section set in the above-mentioned manner is displayed on the live-view screen 300 along with the time bar 310 and the thumbnail image 330 while the video image is captured. Thereafter, the imaging device 10 automatically deletes the time bar 310, the index section object 320, and the thumbnail image 330 from the live-view screen 300 when a predetermined time Ts1 elapses from the start of displaying these.

As described above, the imaging device 10 according to the embodiment of the invention displays the live-view screen 300 while the video image is captured, the live-view screen 300 including the index section object 320 mapped to the time axis of the video image. Accordingly, the user can confirm the time length and the position of the index section, which is automatically set immediately after inputting the instruction for the index, in real time.

[Display Example of Record Confirmation Screen]

Next, with reference to FIG. 7, the description will be made of the display example of the record confirmation screen 400, which is displayed immediately after the completion of the recording of the video image, according to the embodiment of the present invention. FIG. 7 is a diagram illustrating the display example of the record confirmation screen 400 according to the embodiment of the invention.

As shown in FIG. 7, the record confirmation screen 400 is automatically displayed on the display screen of the display panel 20 immediately after the completion of the recording of the video image by the imaging device 10 (immediately after inputting the instruction for the completion of the recording). That is, when the user presses the record completion button (the video image capturing button 30E) and completes capturing and recording the video image, the imaging device 10 displays the record confirmation screen 400 on the display panel 20.

The record confirmation screen 400 is an auto review screen which is automatically displayed on the display panel 20 of the imaging device 10 immediately after the completion of recording the video image. Here, the expression "immediately after inputting the instruction for the completion of the recording (immediately after the completion of the recording)" means "right after the elapse of processing time necessary for generating and displaying the record confirmation screen 400 from the time point at which the instruction for the completion of the recording is input". For example, it is preferable that the record confirmation screen 400 is displayed in a few seconds (for example, one second) after the time point at which the instruction for the completion of the recording is input. The record confirmation screen 400 automatically disappears when a predetermined time Ts2, which is set arbitrarily, is elapsed after the record confirmation screen 400 was automatically displayed immediately after the completion of the recording as long as the user does not operate the touch panel 40 to execute predetermined functions, and the record confirmation screen 400 shifts to a record wait screen. The transition of the screens displayed on the display panel 20 before and after the completion of the recording can be simply described as follows:

(1) The live-view screen 300 being imaged and recorded is displayed during the time period of recording in the recording mode. On this live-view screen 300, the above-mentioned index section object 320 and the like are automatically displayed during the predetermined time Ts2 in response to the input of the instruction for the index. Thereafter, the index section object 320 and the like are not shown on the live-view screen 300.

(2) The record confirmation screen 400 is automatically displayed immediately after the instruction for the completion of the recording is input during the recording time period and the recording is completed. Then, when the user does not operate the record confirmation screen 400, the record confirmation screen 400 is automatically deleted after the predetermined time Ts2 elapses from the start of the display of the record confirmation screen 400.

(3) The record wait screen (not shown) which is a live-view screen being imaged by the imaging device 10 is displayed in the record wait mode (a non-recording time period) after the record confirmation screen 400 was deleted.

Hereinafter, the detailed description will be made of the contents of the record confirmation screen 400 with reference to FIG. 7. As shown in FIG. 7, a replayed image 402 of an arbitrary frame (for example, the last image of the video image) extracted from the recorded video image is displayed in the record confirmation screen 400.

Moreover, a time bar 410, a display object 420 indicating the index section, and the thumbnail image 430 are displayed on the lower side of the record confirmation screen 400 while overlapping on the replayed image 402. The display object 420 is a display object (hereinafter, referred to as an index section object 420) indicating the all index sections set while the video image is captured. The time bar 410, the index section object 420, and the thumbnail images 430 displayed on the record confirmation screen 400 shown in FIG. 7 have substantially the same functional configurations as those of the time bar 310, the index section object 320, and the thumbnail images 330 displayed on the live-view screen 300 shown in FIG. 5.

The time bar 410 is an example of the display object indicating the time axis of the recording time of the recorded video image. The time bar 410 shown in FIG. 7 includes the slider bar with a point shaped slider 412. The position of the slider 412 represents the recording time from the beginning of the video image to the replayed image 402 displayed on the record confirmation screen 400 (that is, the recording time from the time point of starting the recording to the current time). The user can know the position of the replayed image 402 (the frame position) on the time axis by checking the position of the slider 412 in the time bar 410. In addition, when the user taps the slider 412 and slides the slider 412 in a horizontal direction in the time bar 410, the imaging device 10 detects the position of the slider 412, and displays the replayed image 402 of a frame corresponding to the position of the slider 412 from among the video image on the record confirmation screen 400. With this configuration, the user can confirm the replayed image 402 at an arbitrary position on the time axis of the recorded video image. In this regard, the length of the time bar 410 may be constant to scroll-display the time bar 410 such that the slider 412 indicating the current time point is typically disposed in the center of the screen in the horizontal direction. Alternatively, the length of the time bar 410 may be shortened with the passage of replaying time to typically display the whole part of the time bar 410 in the record confirmation screen 400.

The index section object 420 is displayed while a correspondence relationship is made between the index section object and the time bar 410 indicating the time axis of the recording time of the video image. In the example shown in FIG. 7, two index section objects 420A and 420B, which respectively represent two index sections set while one video image is captured, are displayed on the upper side of the time bar 410. The relative position of the index section object 420 with respect to the time bar 410 represents which position on the time axis of the recording time the index section represented by the index section object 420 corresponds to. The user can know the position and the time length of the index section set while the video image is captured by comparing the index section object 420 and the time bar 410.

In addition, the index section object 420 includes the point 422 indicating the time point at which the user inputs the instruction for the index. It can be seen from the example shown in FIG. 7, in which two points 422A and 422B are displayed, that the instruction for the index was input twice while one video image was being captured. The user can know the time point at which the index is added to the video image by checking the point 422 in the index section object 420.

The thumbnail image 430 is a still image as a representative of the index section, and is a image of a frame captured at an arbitrary time point (for example, the start point, the last point, or the time point of inputting the instruction for the index) in the index section of the video image. In the example shown in FIG. 7, the thumbnail images 430A and 430B are pop-up displayed from the points 422A and 422B, respectively for the two index section objects 420A and 420B. The user can confirm the representative image of the set index section on the record confirmation screen 400 by checking such a thumbnail image 430.

As described above, the imaging device 10 according to the embodiment of the invention displays the record confirmation screen 400 including the index section object 420 mapped to the time axis of the video image immediately after the completion of the recording of the video image. With this configuration, the user can confirm the time length and the position of all the index sections set in the video image while the video image is captured, immediately after the completion of the recording of the video image when the user can still remember the contents clearly. Furthermore, the user can confirm whether the index section automatically set by the imaging device 10 is acceptable, and adjusts the index section to the user's desirable section.

Figure 9:
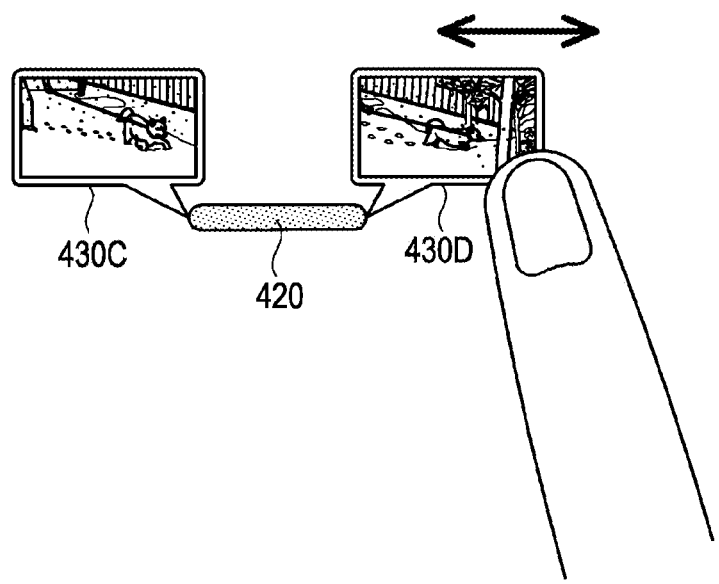
FIG. 9 is a diagram illustrating a modified example of the adjustment of the index section according to the first embodiment of the invention.
Figure 10:
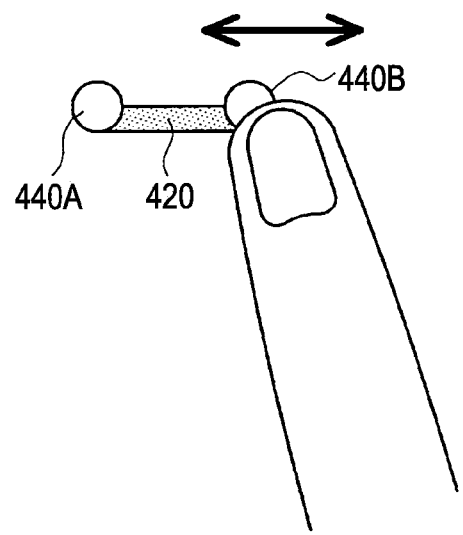
FIG. 10 is a diagram illustrating a modified example of the adjustment of the index section according to the first embodiment of the invention.

Hereinafter, the description will be made of the adjustment processing of the index section on the record confirmation screen 400 with reference to FIGS. 8 to 10. FIG. 8 is a diagram illustrating an adjustment example of the index section in the record confirmation screen 400 according to the embodiment of the invention. FIGS. 9 and 10 are modified examples of the adjustment of the index sections.

As shown in FIG. 8, flag marks 424 representing the start and the last points of the index section are displayed on both ends of the index section object 420 displayed on the record confirmation screen 400. These flag marks 424 are the examples of the display objects representing the start and the last points of the index section. In the example shown in FIG. 8, the flag marks 424A, 424B, 424C, and 424D, each of which represent the start and the last points of respective index sections, are displayed respectively on both ends of the two index section objects 420.

The user taps the flag mark 424 of the index section 420 corresponding to the index section, which the user wants to adjust, with its finger on the record confirmation screen 400, and moves the flag mark 424 in the horizontal direction while the flag mark 424 slides on the record confirmation screen 400. At this time, in accordance with the movement of the flag mark 424, the replayed image 402 on the record confirmation screen 400 is changed to the image of the frame corresponding to the position of the flag mark 424 on the time axis. As a result, the user can accurately adjust the start point or the last point of the index section to the desirable position while checking the replayed image 402 on the record confirmation screen 400.

In response to such a user's operation, the imaging device 10 adjusts the start or the last point of the index section corresponding to the flag mark 424 operated by the user. The detailed description will be made of the adjustment processing of the index section. The touch panel 40 detects the flag mark 424 designated by the user's operation along with the moving amount and the moving direction thereof. The index setting unit 236 specifies the start or last point of the index section corresponding to the detected flag mark 424, and adjusts the start or last point to a position in accordance with the detected moving amount and the moving direction. In the example shown in FIG. 8, for example, when the user moves the flag mark 424B in the left direction, the last point of the index section represented by the index section object 420 is adjusted, and the time length of the index section is shortened.

In addition, FIG. 9 shows a modified example in which the flag marks 424 of FIG. 8 are replaced with the thumbnail images 430. The thumbnail images 430C and 430D are the images of the frames at the start point and the last point of the index section corresponding to the index section object 420. Moreover, FIG. 10 shows a modified example in which the flag marks 424 of FIG. 8 are replaced with the GUI buttons 440. The user can adjust the index section in the same manner as in the case of the flag mark 424 by designating the thumbnail image 430 or the GUI button 440 on the record confirmation screen 400 and moving it in a desirable direction by a desirable moving amount.

As described above, the user can adjust the start point and the last point of the index section, which is automatically set by the imaging device 10, to the start point and the last point of the scene, which the user recognizes as the exciting scene, on the record confirmation screen 400. Since the record confirmation screen 400 is displayed immediately after the completion of the recording of the video image when the user can still remember the contents clearly, the user can accurately adjust the index section automatically set by the imaging device 10 to a desirable section. By accurately adjusting the index section immediately after the recording in this manner, this adjustment functions as a precise guide in editing the video image later.

This record confirmation screen 400 has all of (a) the auto review function for showing the user the index section set in the recorded video image immediately after the recording, (b) the adjustment function for adjusting the index section immediately after the recording, and (c) the editing function for executing the predetermined functions (the replay, the deletion, the rating, and the like) with respect to at least a part of the video image immediately after the recording. Both (a) the auto review function and (b) the adjustment function are implemented by the index section object 420 and the like which is displayed in the record confirmation screen 400 with the correspondence relationship with the time axis of the recording time. In addition, (c) the editing function is implemented by the functional icons 450 (refer to FIGS. 7 and 8) displayed on the record confirmation screen 400.

Here, referring again to FIGS. 7 and 8, the description will be made of the editing function of the video image using the functional icons 450 on the record confirmation screen 400.

As shown in FIGS. 7 and 8, a plurality of functional icons 450 is displayed on the record confirmation screen 400. The functional icons 450 are the GUI components which start to execute the predetermined functions (for example, the replay, the rating, the deletion, and the like) with respect to the recorded video image. In the example shown in FIG. 8, three functional icons 450, that is, a replay icon 450A, a rating icon 450B, and a deletion icon 450C are displayed on the light side of the record confirmation screen 400.

The replay icon 450A is a functional icon for replaying only the index section in the video image recorded in the recording medium 2. The rating icon 450B is a functional icon for adding an evaluation value to the index section of the video image recorded in the recording medium 2. The deletion icon 450C is a functional icon for deleting the sections other than the index section in the video image recorded in the recording medium 2.

The user can execute the function corresponding to a selected functional icon 450 with respect to the recorded video image by designating the functional icon 450 on the record confirmation screen 400. As described above, the touch panel 40 is provided on the display panel 20 of the imaging device 10, and the touch panel 40 detects the position (the screen position) on the record confirmation screen 400, which was designated by the user. It is possible to detect the operation of selecting the functional icon 450 by using such a touch panel 40.

The imaging device 10 detects the existence of the user's operation using the touch panel 40 while the record confirmation screen 400 is displayed. As a result, when the position detected by the touch panel 40 while the record confirmation screen 400 is displayed corresponds to the display position of any functional icon 450, it can be understood that the user selected the functional icon 450. in this case, the imaging device 10 determines that the instruction for the execution of the function corresponding to the functional icon 450 is input, and executes the function corresponding to the functional icon 450 with respect to the index section or the other section in the recorded video image.

For example, when the user designates (taps) the replay icon 450A while the record confirmation screen 400 is displayed, the imaging device 10 extracts the image data of the index section from the video image recorded in the recording medium 2, based on the index information, replays the image data of the index section, and displays the replayed image on the record confirmation screen 400. Accordingly, the user can watch only the image of the index section, which is constituted by the exciting scene and the like, in the recorded video image. Thus, it is possible to efficiently confirm the desirable section of the video image.

In addition, when the user designates (taps) the rating icon 450B while the record confirmation screen 400 is displayed, the imaging device 10 adds the evaluation value designated by the user with respect to the index section of the video image recorded in the recording medium 2. For example, the imaging device 10 may display the screen (not shown) for inputting the evaluation value in response to the designation of the rating icon, and add the evaluation value designated in the input screen to the video image. It is possible to add the evaluation value of multiple stages from level 1 to 5, for example. The information of the input evaluation value is associated with the video image and stored in the recording medium 2 and the like. Such information of the evaluation value is useful in replaying or editing the video image later.

Moreover, when the user designates (taps) the deletion icon 450C while the record confirmation screen 400 is displayed, the imaging device 10 deletes the image data of the sections other than the index section in the video image from the recording medium 2. In this case, the imaging device 10 may directly delete the image data of the sections other than the index section in the video image in response to the user's operation on the deletion icon 450C. Alternatively, the imaging device 10 may display a confirmation dialogue (not shown) for confirming whether or not to delete the image data, and delete the image data of the sections other than the index section of the video image when the user confirms the deletion of the image data. Furthermore, as a method for deleting the video image, it is possible to exemplify some methods such as a method in which the data of the video image is moved to the deletion list, stored for a predetermined time period, and then deleted or a method in which the data of the video image is not shown to the user while the data is actually stored in addition to a method in which the data of the video image recorded in the recording medium 2 is completely deleted.

As described above, it is possible to replay the index section, which the user wants to watch, in the recorded video image, and delete only the unnecessary sections other than the index section with a simple user's operation of tapping the functional icon 450 on the record confirmation screen 400. The user can replay only the index section, or easily performs the editing operation such as a non-temporal recording of only the index section in the recording medium 2 only by designating the functional icon 450 on the record confirmation screen 400. In addition, it is possible to record in the recording medium 2 only the image data of the index section, which is a necessary part for the user, in the captured video image. Accordingly, it is possible to efficiently record the necessary video image without wasting the recording area of the recording medium 2.

As described above, the description was made of the adjustment function for the index section and the editing function for the video image on the record confirmation screen 400 with reference to FIGS. 7 to 10. According to the record confirmation screen 400 of the embodiment of the present invention, the user can adjust the index section set while the image was being captured to a desirable section immediately after the recording of the video image when the user can clearly remember the contents. Therefore, it is possible to add an index section with higher accuracy to the video image. In addition, not an index point as a time point but an index section with a predetermined time length is added to the video image. Therefore, when the video image is replayed and edited after imaged, it is possible to efficiently replay and edit the video image in a short time while using the index section as a guide.

Moreover, according to the record confirmation screen 400, the user can replay and edit the video image while using the index section as a reference immediately after the recording of the video image when the user can remember the contents clearly. In addition, the replaying operation or the editing operation for the video image can be implemented by a user's simple operation of designating the functional icon 450 using the touch panel 40.

In selecting and editing the recorded video image later using the imaging device in related art, it was necessary to replay the video image from the beginning thereof and confirm the contents, and these operations were very complicated and inefficient. On the other hand, according to the record confirmation screen 400 of the embodiment of the present invention, it is possible to replay only the index section of the video image and perform the editing operation such as a deletion of the unnecessary sections other then the index section of the video image immediately after the recording when the user can still remember the contents clearly. Accordingly, the replaying and editing operations are easily implemented, and this is very convenient for the user. In addition, if the index section of the video image is partially rated immediately after the recording on the record confirmation screen 400, it can be used conveniently when the user replays and sees or edits the video image later.

[Processing Flow by Imaging Device]

Next, with reference to FIG. 11, the description will be made of the flow of imaging and image processing by the imaging device 10 according to the embodiment of the invention. FIG. 11 is a flow chart illustrating the processing method at a time of imaging and completing the recording by the imaging device 10 according to the embodiment of the invention.

Figure 11A:
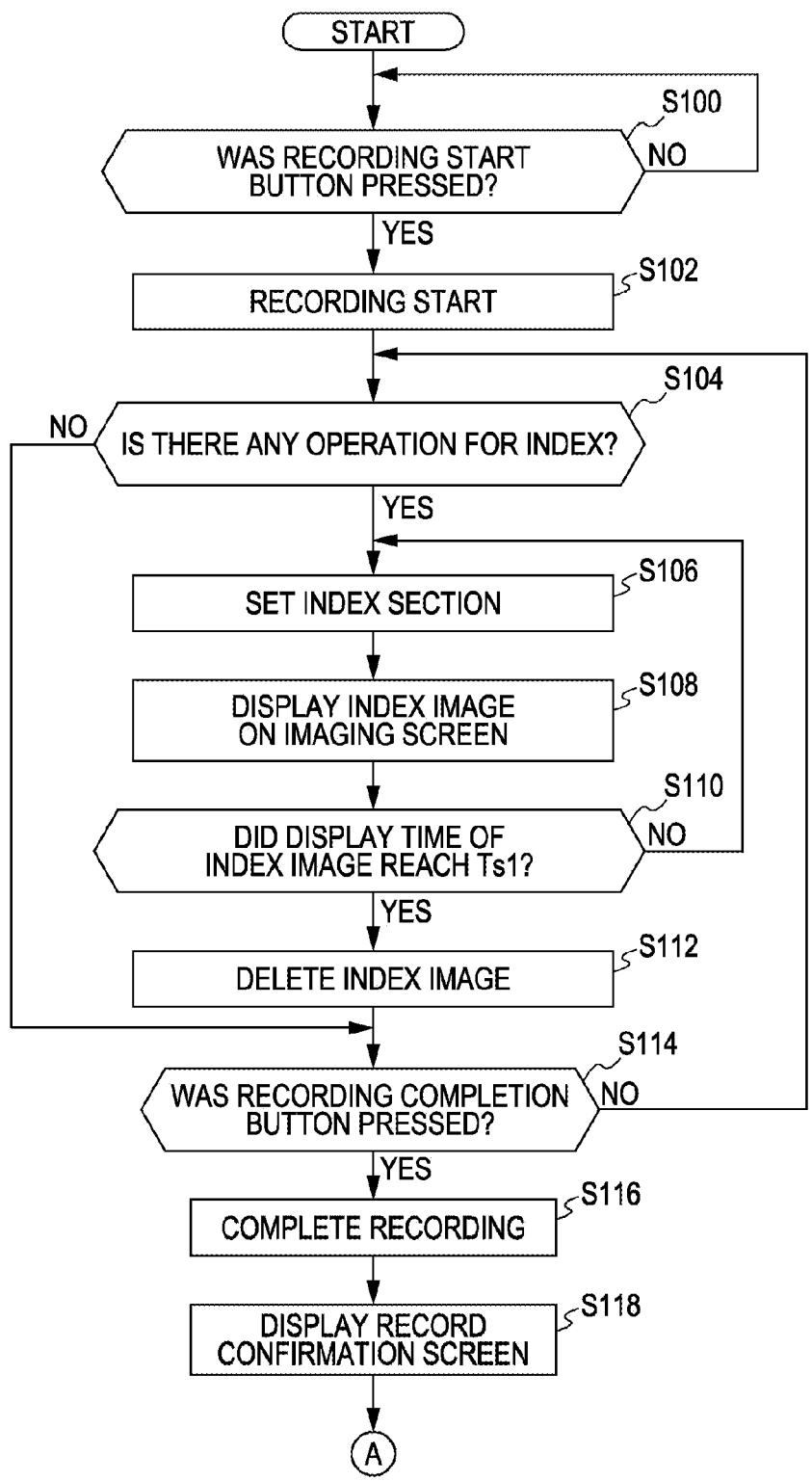
FIG. 11A is a flowchart illustrating a processing method from the time of capturing the video image to the time of completing the recording with the imaging device according to the first embodiment of the invention.

As shown in FIG. 11A, when the user presses the record start button (the video image capturing button 30E) and inputs the instruction for the start of the recording (S100), the imaging device 10 starts the recording operation of the video image (S102). In this recording operation of the video image, the imaging device 10 images the object and records a plurality of frames obtained by the imaging in the disc shaped recording medium 2. In addition, the imaging device 10 displays the live-view screen 300 (refer to FIG. 5) displaying the captured image 302 being currently captured on the display panel 20.

The imaging device 10 detects whether or not one user's operation was performed with respect to the index operating unit (for example, the index button 30F, or the touch panel 40), that is, whether or not the instruction for the index was input by the user (S104). The user can input the instruction for index to the imaging device 10 by pressing the index button 30F or by tapping the index icon 306 on the live-view screen 300.

Then, the imaging device 10 set the section of the video image captured for the predetermined time period including the time point at which the instruction for the index was input as the index section in response to the input of the instruction for the index (S106). For example, as shown in FIGS. 6A to 6C, the imaging device 10 sets the index time period so as to include the time point of inputting the instruction for the index, and sets the index section constituted by a plurality of frames captured during the index time period.

Moreover, the imaging device 10 displays the index image representing the index section set in S104 on the live-view screen 300 (S108). The index image includes the time bar 310 described with reference to FIG. 5, the index section object 320, the thumbnail image 330, and the like. By display such an index image on the live-view screen 300, the user can confirm the index section set in response to the operation for the index in S104 while the video image is captured. Thereafter, when the displaying time of the index image on the live-view screen 300 reaches the predetermined time Ts1 (S110), the imaging device 10 deletes the index image from the live-view screen 300 (S112).

The recoding processing of the video image and the setting and displaying processing S104 to S112 of the index section are continued until the user inputs the instruction for the completion of the recording (S114). That is, the imaging device 10 detects whether or not the instruction for the completion of the recording was input by the user, that is, whether or not the record completion button (that is, the video image capturing button 30E) was pressed during the recording period (S114). When the instruction for the completion of the recording was input, the imaging device 10 completes the recording operation (S116), and displays the record confirmation screen 400 (refer to FIG. 7) regarding the recorded video image (S118). The record confirmation screen 400 includes the time bar 410 described with reference to FIG. 7, the index section object 420, the thumbnail image 430, and the like. The user can confirm again all the index sections set during the recording immediately after the completion of the recording, using this record confirmation screen 400.

Figure 11B:
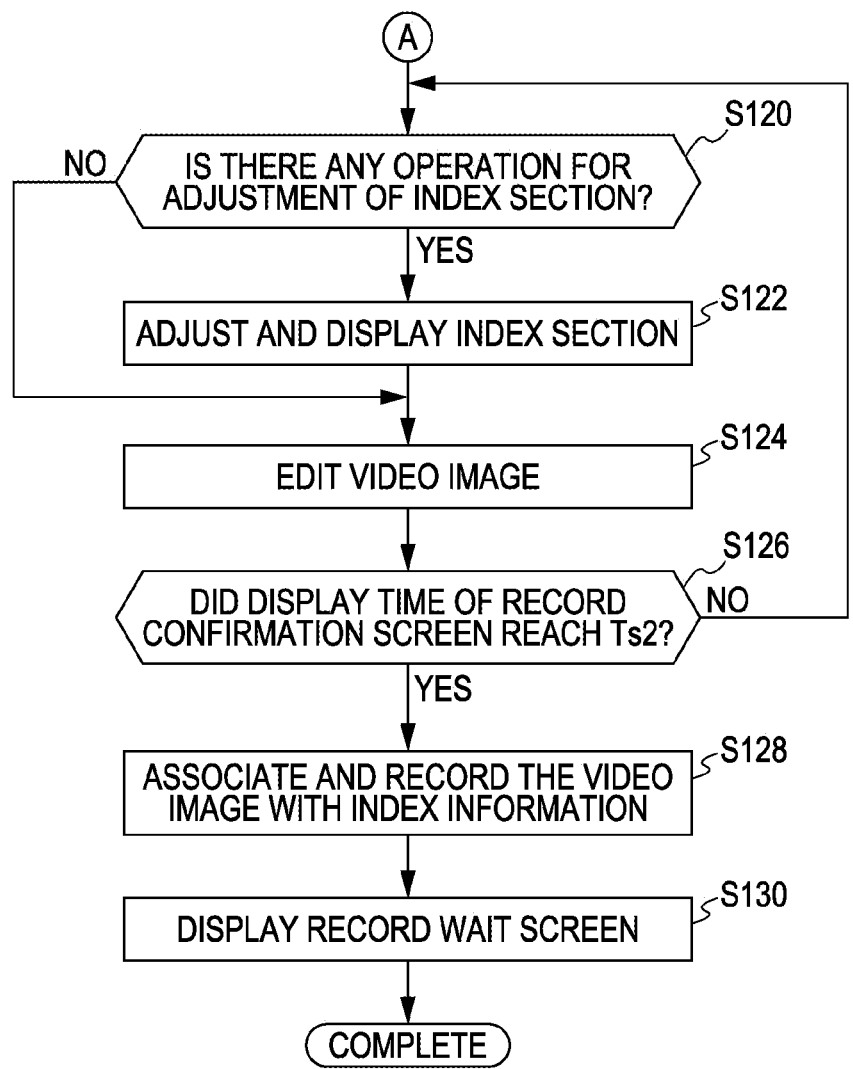
FIG. 11B is a flowchart illustrating a processing method from the time of capturing the video image to the time of completing the recording with the imaging device according to the first embodiment of the invention.

Furthermore, as shown in FIG. 11B, the imaging device 10 detects whether or not the adjustment operation for the index section was performed by the user while the record confirmation screen 400 is displayed (S120). As shown in FIG. 8, the user can adjust the start or last point of the index section by operating the index section object 420 on the record confirmation screen 400. When the user's operation for adjusting the index section was performed, the imaging device 10 adjusts the index section in response to the user's operation, updates the index information in the memory 238, and displays the index section object 420 corresponding to the adjusted index section on the record confirmation screen 400 (S122).

In addition, when the user operates the functional icon 450 on the record confirmation screen 400 while the record confirmation screen 400 is displayed, the imaging device 10 edits the video image in response to the user's operation on the functional icon 450 (S124). For example, when the replay icon 450A on the record confirmation screen 400 is designated, the imaging device 10 replays only the index section in the recorded video image. Moreover, when the deletion icon 450C on the record confirmation screen 400 is designated, the imaging device 10 deletes the sections other than the index section in the recorded video image.

Thereafter, when the display time of the record confirmation screen 400 reaches the predetermined time Ts2 (S126) without performing the adjustment operation for the index section (S120) or the editing operation for the video image (S124), the imaging device 10 associates the video image with the index information and stores them in the recording medium 2 (S128). When the video image was edited in S124, the imaging device 10 records the edited image (for example, the image data of only the index section). In addition, when the index section was adjusted in S122, the imaging device 10 records the index information representing the adjusted index section.

Furthermore, the imaging device 10 shifts to the record wait state, automatically deletes the record confirmation screen 400, and displays the record wait screen (S130). The record wait screen is a live-view screen displayed in the record wait mode, and the image being captured by the imaging device 10 is displayed as the record wait screen. In this regard, the imaging device 10 is not necessarily configured to shift record wait mode after displaying the record confirmation screen 400 as described above. For example, when the user is performing the editing operation for longer than a predetermined time using the record confirmation screen 400, the imaging device may shift to the editing mode for editing the video image. This editing mode means the dedicated function for the editing during the replay mode.

As described above, according to the embodiment of the present invention, when the display time of the record confirmation screen 400 reaches the predetermined time Ts2, the imaging device 10 non-temporarily records the video image and the index information, and automatically deletes the record confirmation screen 400. As another example, the record confirmation screen 400 may be provided thereon with a GUI button for completing the display of the record confirmation screen 400. When the user designates (taps) the GUI button, the imaging device 10 may record the video image and the index information in the recording medium, delete the record confirmation screen 400, and return to the record wait state.

2. Second Embodiment

Next, a second embodiment of the present invention will be described. The imaging device 10 according to the second embodiment sets the section, in which an object designated by the user on the live-view screen 300 while the video image is captured appears, as the index section. The second embodiment is different from the first embodiment in the setting method of the index section, and the other functional configurations are substantially the same as those in the first embodiment, thereby omitting the detailed description thereof.

[Setting of Index Section by Object Recognition]

First, with reference to FIG. 12, the description will be made of the setting method of the index section using the object recognition according to the second embodiment of the invention. FIG. 12 is a diagram illustrating the display example at the time of setting the index section by designating an object 340 in the captured image 302 on the live-view screen 300 according to the second embodiment of the invention.

As shown in FIG. 12, the captured image 302 of the object being imaged by the imaging device 10 is displayed in real time on the live-view screen 300 while the video image is captured. The object 340 (a dog in the example shown in FIG. 12) which the user wants to image is in the captured image 302 on the live-view screen 300. The object is an arbitrary thing as a target to be imaged by the imaging device 10, such as a person, a face of a person, an animal, a plant, a vehicle, a building, a landscape, or the like.

When the user designates (taps) the object 340 in the captured image 302 with its finger while the video image is captured, the imaging device 10 recognizes the object 340 in the position on the live-view screen 300, which is designated by the user. Then, the imaging device 10 sets the section, in which the object 340 appears, in the video image captured during the recording time period as the index section. Hereinafter, the description will be made of the operation at the time of setting the index section using the object recognition in this manner.

First, the user designates the object 340 displayed on the live-view screen 300 using the operating body while checking the live-view screen 300 while the video image is captured. The user's operation of designating the object 340 corresponds to the operation of inputting the instruction for the index with respect to the imaging device 10. The touch panel 40 detects the position, which was designated by the user, on the live-view screen 300 in response to the designation of the object 340 with respect to the live-view screen 300. Then, the imaging device 10 analyzes the frame of the captured image 302 at the time point, thereby recognizes the object 340 in the screen position designated by the touch panel 40. Subsequently, the object recognition unit 240 specifies a plurality of frames, in which the object 340 appears, from the video image captured during the recording time period. Then, the imaging device 10 sets the section of the video image, which is constituted by the plurality of frames in which the object 340 appears, as the index section. This index section covers before and after the time point of user's inputting of the instruction for the index (the time point at which the object 340 was tapped) as long as the object 340 appears in the section. That is, the index section includes both the section which was already captured before the time point of inputting the instruction for the index (the part corresponding to the index section object 320 in FIG. 12) and the section which is captured after the time point of inputting the instruction (not shown in FIG. 12).

When the index section is set by the object recognition, the imaging device 10 displays the index image regarding the set index section on the live-view screen 300 for the predetermined time Ts1 as shown in FIG. 12. This index image includes an object model 345 in addition to the time bar 310, the index section object 320, and the thumbnail image 330 which are described above. The object model 345 is a display model which is obtained by making the recognized object 340 animated. The user can confirm the position and the time length of the index section in which the designated object 340 appears by checking such an index image. In addition, it is possible to confirm the recognized object 340 by the object model 345.

As described above, the imaging device 10 according to the embodiment of the invention uses the object recognition, automatically picks up only the section in which the object 340 designated by the user appears, and sets the index section. With this configuration, the user can add the index to the section of the video image in which the desirable object 340 appears only by a simple operation of designating the object 340 on the live-view screen 300. Accordingly, it is easy to distinguish the section in which the desirable object 340 appears and the other sections in replaying and editing the video image after imaging. In addition, the user can replay only the section in which the object 340 appears, or delete the other sections (that is, the sections in which the object 340 does not appear). Moreover, since it is possible to input the instruction for the index by the user's operation on an arbitrary position on the touch panel 40, it is not necessary to provide the dedicated operating unit for the index (the index button 30F, or the index icon 306) as in the first embodiment.

[Deletion of Sections in which Object does not Appear]

Figure 13:
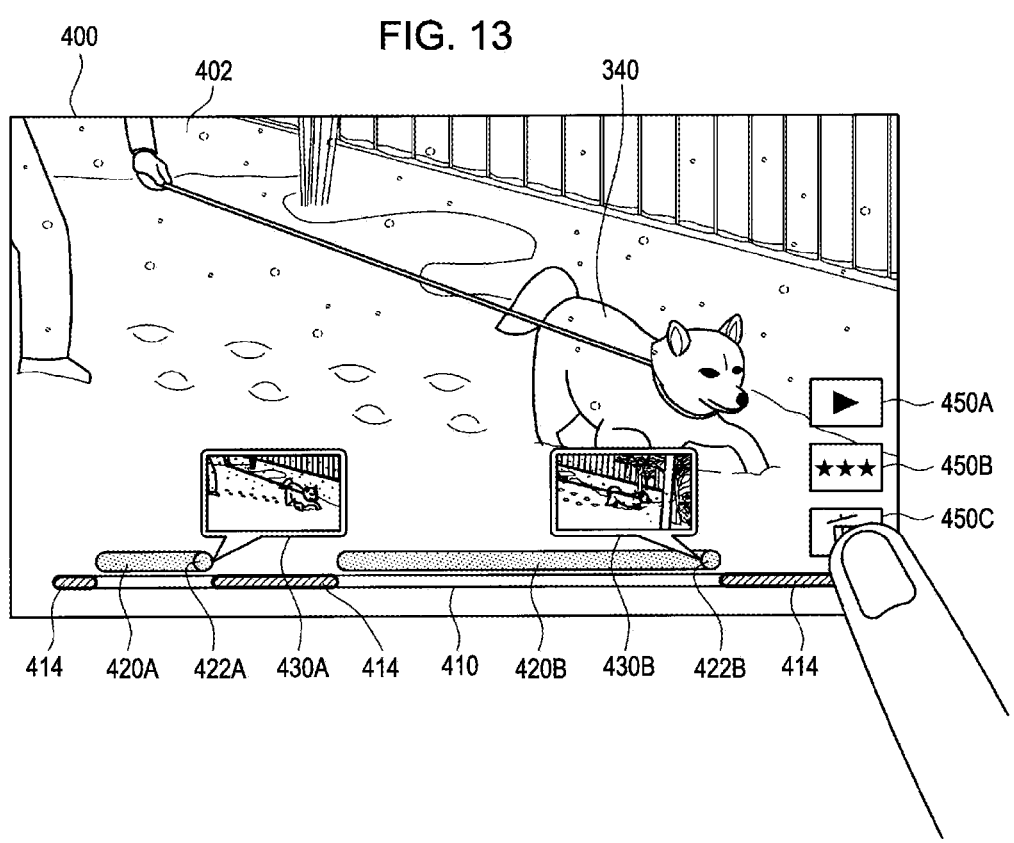
FIG. 13 is a diagram illustrating a display example of the live-view screen according to the second embodiment of the invention.

Next, with reference to FIG. 13, the description will be made of the method for deleting a part of the video image on the record confirmation screen 400 using the deletion icon 450C after imaging. FIG. 13 is a diagram illustrating the display example at the time of deleting the sections other than the index section in the record confirmation screen 400 according to the embodiment of the invention.

As shown in FIG. 13, the above-mentioned functional icons 450 are displayed on the record confirmation screen 400 which is displayed after the completion of the recording. The deletion icon 450C among these functional icons is an operating button for deleting the sections other than the index section in the recorded video image all together. When the user designates (taps) the deletion icon 450C while the record confirmation screen 400 is displayed, the imaging device 10 deletes the image data of the sections other than the index section in the temporarily recorded video image, and non-temporarily records the image data of only the index section in the recording medium 2.

Specifically, in the example shown in FIG. 13, the index section is set, by the object designation described with reference to FIG. 12, while the video image is captured, and the sections in which the object 340 does not appear are deleted in the record confirmation screen 400 displayed after the completion of the recording of the video image. As shown in FIG. 13, two index section objects 420A and 420B are displayed on the record confirmation screen 400. It can be seen from this display that the two index sections were set while the video image was being captured and the object 340 (for example, a dog) designated by the user while the video image was being captured appears in the respective index sections.

When the user taps the deletion icon 450C in the record confirmation screen 400, the imaging device 10 specifies the index section in which the object 340 appears and the other sections based on the index information recorded in the memory 238 while the video image was being captured. Then, the imaging device 10 deletes the sections in which the object 340 does not appear (corresponding to the shaded area 414 in the time bar 410 shown in FIG. 13) in the temporarily recorded video image, and non-temporarily records the section in which the object 340 appears (corresponding to the index section object 420 in FIG. 13) in the recording medium 2.

As described above, the imaging device 10 deletes the unnecessary sections, in which the object 340 designated by the user while the video image is captured does not appear, in response to the user's simple operation of tapping the deletion icon 450C, and records only the necessary sections in which the object 340 appears. Accordingly, the user can pick up and record only the image section in which the desirable object appears only by designating the object 340 in the live-view screen 300 shown in FIG. 12 while the video image is captured and then designating the deletion icon 450C in the record confirmation screen 400 shown in FIG. 13. Therefore, it is possible to efficiently execute the editing operation for the video image in a short time.

[Auto-Deletion of the Section in which Object does not Appear]

Figure 14:
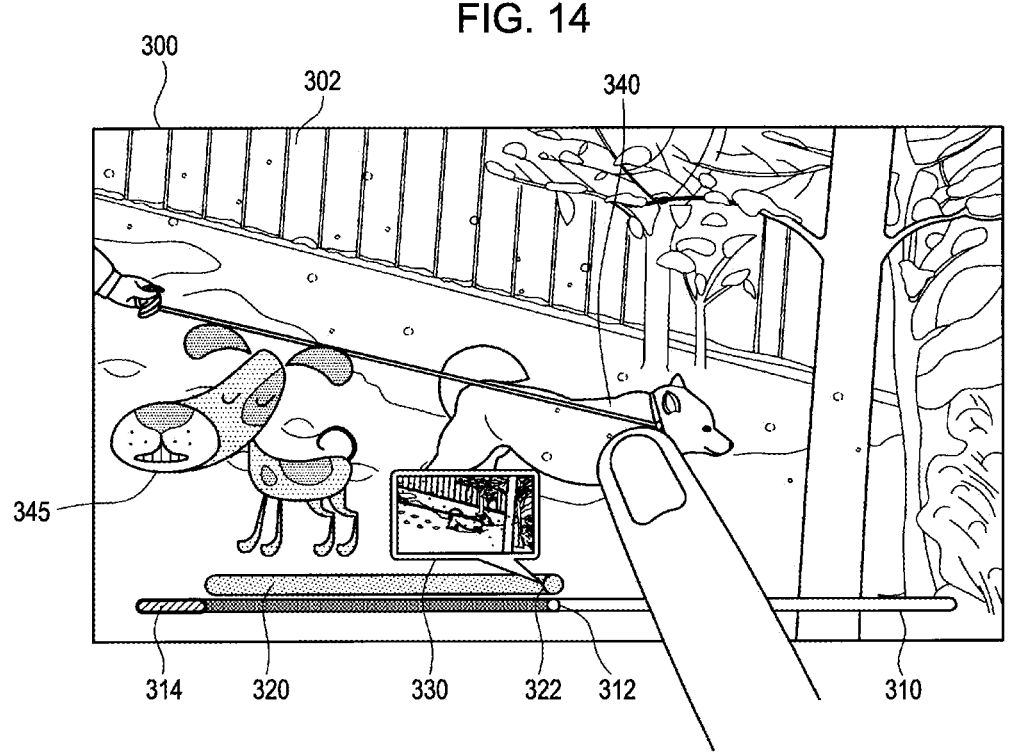
FIG. 14 is a diagram illustrating a display example of the live-view screen according to the second embodiment of the invention.

Next, with reference to FIG. 14, the description will be made of the method for automatically deleting a part of the video image in the live-view screen 300 while the video image is captured. FIG. 14 is a diagram illustrating the display example at the time of automatically deleting the section captured before the index section, in the live-view screen 300 according to this embodiment of the invention.

As shown in FIG. 14, when the user designates (taps) the object 340 displayed on the live-view screen 300 while the video image is captured, the imaging device 10 sets the section in which the object 340 appears as the index section by the object recognition in the same manner as in FIG. 12. Moreover, the imaging device 10 automatically deletes the section of the video image captured before the index section in accordance with the setting of the index section which is accompanied with the designation of the object 340. Here, the section of the video image captured before the index section means the section from the beginning of the video image being captured to the start point of the set index section (corresponding to the shaded area 314 in the time bar 310 shown in FIG. 14).

As described above, the imaging device 10 automatically deletes the section before the index section in the video image which was already imaged and recorded, at the time point at which the index section is set by the object recognition while the video image is captured. As a result, the image device 10 can automatically deletes the unnecessary section captured before the index section even if the user does not perform the deletion operation while the video image is captured.

Such an auto-deletion is useful in the following use case, for example. A case is assumed in which the user gets ready for imaging a moving thing A (for example, a running child in an athletic festival, a traveling train, and the like) with the imaging device 10 which is being operated for the recording, for example. In this case, when the moving thing A enters the imaging range of the imaging device 10, the user taps the thing A appearing in the live-view screen 300. Then, the imaging device 10 sets the section in which the thing A appears as the index section, and automatically deletes the data of the part which was captured before the thing A appears. With these operations, the imaging device 10 can record only the image data of the section in which the desirable thing A appears, in the recording medium.

In the examples of FIGS. 12 to 14, the description was made of the examples in which a dog was exemplified as the object 340 and the section in which the dog appeared was set as the index section. However, the embodiment of the present invention is not limited to the example. For example, a face of a person may be designated as the object 340, and the section in which the face of the person appears may be set as the index section. In addition, it is also possible to combine the object recognition technique and the smile detection technique and set the section in which the person's smile appears as the index section.

3. Third Embodiment

Next, a third embodiment of the present invention will be described. The imaging device 10 according to the third embodiment of the invention sets the index section in response to the user's gesture (the method of sliding on the display screen) with respect to the touch panel 40, while the video image is captured. In addition, the third embodiment is different from the first and the second embodiments in the setting method of the index section, and the other functional configurations are substantially the same as those in the first and second embodiments, thereby omitting the detailed description.

As described above, the touch panel 40 can detects not only the position on the display screen, which is designated by the operating body (for example, a user's finger), but also the method how the operating body slides on the display screen (for example, the sliding direction and the sliding length). Accordingly, when the user's operating body slides on the display screen while the video image is captured, the imaging device 10 can detect the sliding method using the touch panel 40, and change the setting method of the index part in accordance with the sliding method.

For example, the imaging device 10 sets the index section while using the time point at which the operating body slides on the display screen as a reference in accordance with the sliding direction of the operating body on the display screen. In addition, the imaging device 10 sets the time length and the start point of the index section in accordance with the sliding length of the operating body on the display screen. In this manner, it is possible to increase the variations of the index section which can be set by the imaging device 10 in response to one user's operation on the display screen, by setting the index section in accordance with the sliding method on the display screen by the user. Accordingly, the user can instructs the imaging device 10 to set the desirable index section with a simple operation. Hereinafter, a specific display example will be described.

[Setting of Index Section in Accordance with Sliding Direction on Screen]

Figure 15:
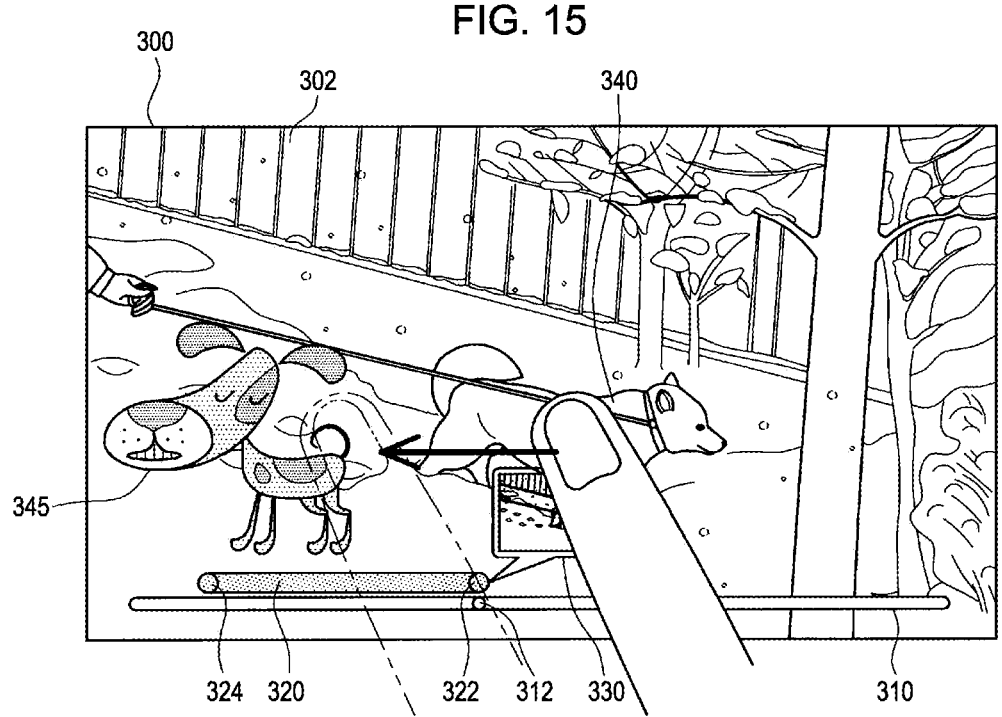
FIG. 15 is a diagram illustrating a display example of a live-view screen according to a third embodiment of the invention.
Figure 16:
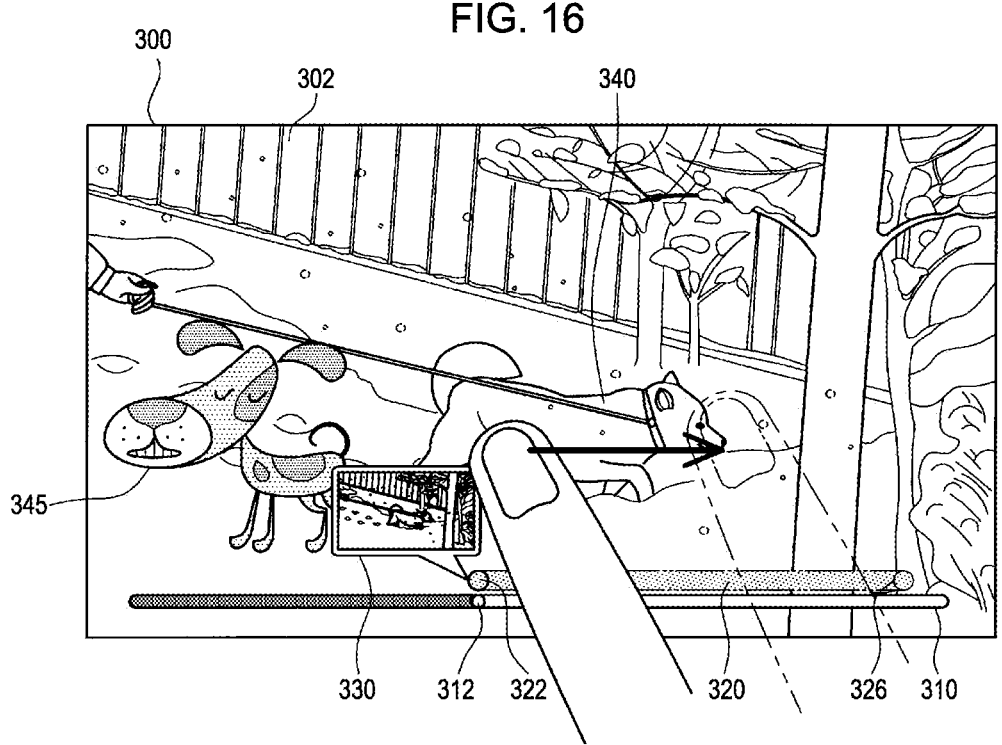
FIG. 16 is a diagram illustrating a display example of the live-view screen according to the third embodiment of the invention.
Figure 17:
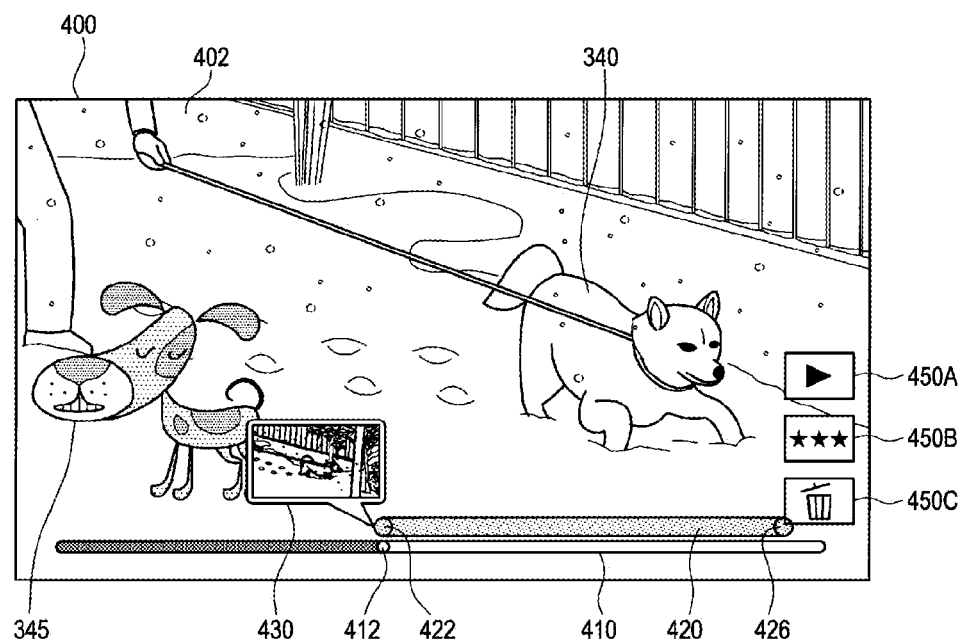
FIG. 17 is a diagram illustrating a display example of a record confirmation screen according to the third embodiment of the invention.

First, with reference to FIGS. 15 and 17, the description will be made of the method of setting the index section in accordance with the sliding direction on the display screen in the live-view screen 300 according to the third embodiment of the invention. FIG. 15 shows a display example when the operating body slides on the object 340 in the left direction on the live-view screen 300, and FIG. 16 shows a display example when the operating body slides on the object 340 in the right direction on the live-view screen 300. FIG. 17 shows a display example of the record confirmation screen 400 displaying the index part set in FIG. 16.

As shown in FIG. 15, when the user's finger slid on the object 340 included in the captured image 302 on the live-view screen 300 in the left direction while the video image was being captured, first of all, the imaging device 10 detects the position on the live-view screen 300, on which the finger slid, and the sliding direction using the touch panel 40. Then, the imaging device 10 recognizes the object 340 which appears in the position on the live-view screen 300, on which the finger slid. In this case, the user's operation of sliding on the display screen (the touch panel 40) corresponds to the operation of inputting the instruction for the index, and the time point at which the finger slides on the display screen corresponds to the time point of inputting the instruction for the index. In addition, the processing for recognizing the object 340 is the same as that in the second embodiment.

Next, the imaging device 10 sets, as the index section, the section from the start point (corresponding to the point 324) of the section in which the object 340 appears to the time point at which the finger slides on the display screen (corresponding to the point 322) in the video image which was already captured before the time point at which the finger slides on the display screen. Here, the start point of the section in which the object 340 appears corresponds to the frame in which the object 340 is recognized in the video image for the first time. Thereafter, the imaging device 10 displays the index display such as the index section object 420 which represents the set index section, on the live-view screen 300.

As described above, when the finger slides on the object 340 in the left direction on the live-view screen 300, the section, in which the object 340 appears, in the video image captured before the time point at which the finger slides on the object 340 (that is, the time point of inputting the instruction for the index) is set as the index section. For example, when the user thinks that it is the time to complete the imaging of the object 340 while the desirable object 340 is imaged, the above setting method is useful for the case in which the video image is captured a little longer just in case.

On the other hand, as shown in FIG. 16, when the user's finger slide on the object 340 included in the captured image 302 on the live-view screen 300 in the right direction while the video image is captured, the imaging device 10 detects the position on the live-view screen 300, on which the finger slid, and the sliding direction by the touch panel 40, and recognizes the object 340 which appears in the position on which the finger slid. Then, the imaging device 10 sets as the index section, the section from the time point at which the finger slid on the display screen (corresponding to the point 322) to the last point of the section in which the object 340 appears (corresponding to the point 326) in the video image captured after the time point at which the finger slid on the display screen. Here, the last point of the section in which the object 340 appears corresponds to the frame in which the object 340 recognized in the video image for the last time.

In the example shown in FIG. 16, since the last point of the index section (corresponding to the point 326) is unknown at the time point at which the finger slides on the object 340 in the right direction, the imaging device 10 sets only the start point of the index section (corresponding to the point 322). In addition, the imaging device 10 displays only the point 322 representing the start point of the index section object 420 on the live-view screen 300, and then extends and displays the index section object 420 on the right side with the passage of the imaging time. Thereafter, when the object 340 moves out from the imaging range and does not appear in the captured image 308, the imaging device 10 sets the last point of the index section (corresponding to the point 326), and displays the index section object 420 representing the whole index section which has been fixed.

As described above, when the index section is set by the finger's sliding on the object 340 in the right direction on the live-view screen 300 shown in FIG. 16, it is possible to confirm the final index section on the record confirmation screen 400 shown in FIG. 17, which is displayed after the completion of the recording. In the live-view screen 300 shown in FIG. 17, the index section object 420 representing the index section set by the sliding operation in the right direction. The point 422 at the left end of the index section object 420 represents the start point of the index section (the time point of inputting the instruction for the index), and the point 426 at the right end represents the last point of the index section.

As described above, when the finger slides on the object 340 in the right direction on the live-view screen 300, the section, in which the object 340 appears, in the video image captured after the time point at which the finger slides on the object (the time point of inputting the instruction for the index) is set as the index section. This setting method is useful for the case in which the user wants to image entirely the object 340 in the rest part after the time point at which the exciting scene of the object 340 appears while the desirable object 340 is imaged.

[Setting of Index Section in Accordance with Sliding Length on Screen]

Figure 18:
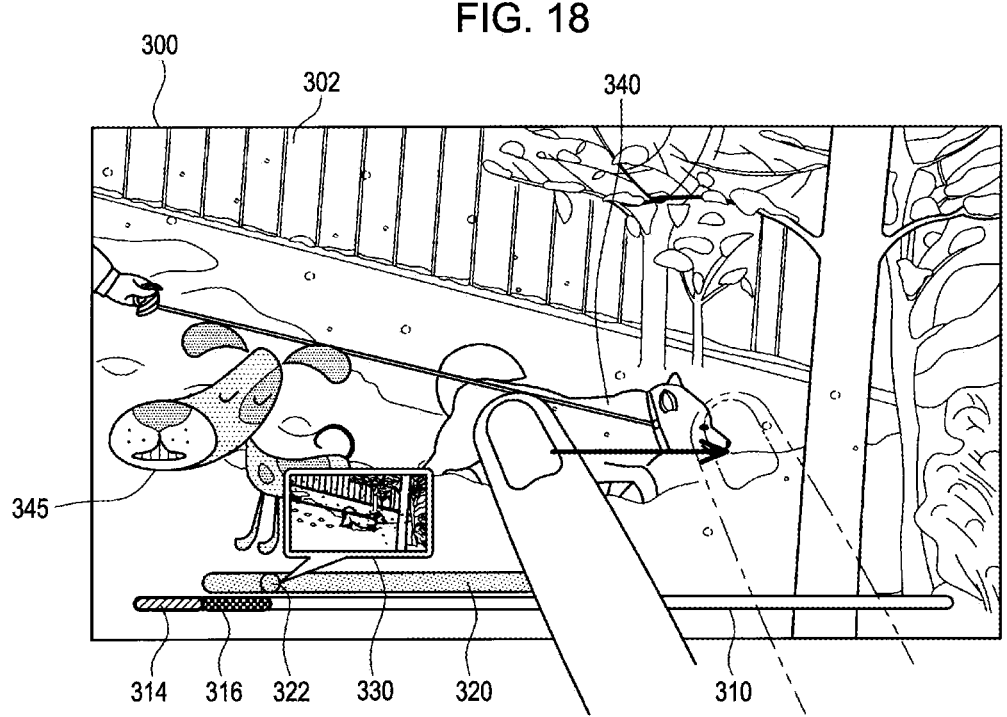
FIG. 18 is a diagram illustrating a display example of the live-view screen according to the third embodiment of the invention.
Figure 19:
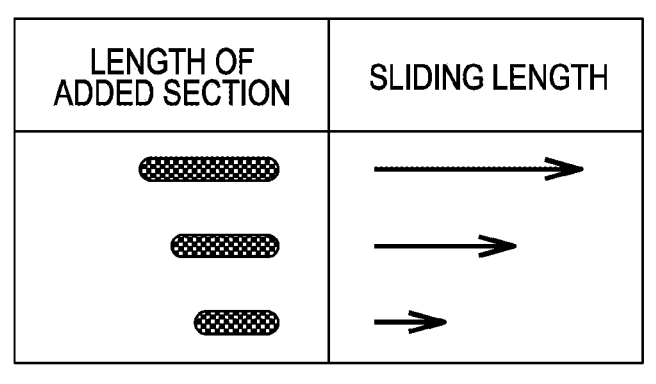

Next, with reference to FIGS. 18 and 19, the description will be made of the method for setting the index section in accordance with the sliding length on the display image in the live-view screen 300 according to the third embodiment of the invention. FIG. 18 is a display example when the finger slides on the object 340 on the live-view screen 300. FIG. 19 is a diagram illustrating the relationship between the sliding length and the time length of an added section.

As shown in FIG. 19, when the user's finger slides on the object 340 included in the captured image 302 on the live-view screen 300 in an arbitrary direction (the right direction in FIG. 19) while the video image is captured, the imaging device 10 first detects the sliding position and the sliding direction on the live-view screen 300 by the touch panel 40. Then the imaging device 10 recognizes the object 340 which appears in the position, on which the finger slid, on the live-view screen 300.

Then the imaging device 10 sets the time length of the added section (corresponding to the checked part 316 in the time bar 310 shown in FIG. 18) in accordance with the sliding length. As shown in FIG. 19, the imaging device 10 sets the time length of the added section such that the longer the sliding length on the display screen by the user is, the longer the time length of the added section is.

Here, the added section is a section captured for a predetermined time before the time point of inputting the instruction for the index (the time point at which the finger slides on the display screen), and included in the index section. This added section is constituted by the image captured a little before the time point of inputting the instruction for the index. Therefore, there is a high possibility that the added section is a scene in which the desirable object 340 appears or the introduction part of the exciting scene. It is possible to allow these necessary scenes to be included in the index section by allowing the added section to be included in the index section. Accordingly, it is possible to compensate the delay of the user's input of the instruction for the index. However, the unnecessarily long added section is not appropriate since an unnecessary section is unfavorably included in the index section.

Thus, the imaging device 10 sets the time length of the added section in accordance with the sliding length by the user in order to adjust the time length of the added section appropriately in response to the user's operation (the gesture) on the live-view screen 300. As a result user can set the time length of the added section to a desirable one by changing the sliding length. For example, the user's finger may slide on the display screen with a long sliding length when the user wants to set the added section before inputting of the instruction for the index to be longer, and the user's finger may slide on the display screen with a short sliding length when the user wants to set the above-mentioned added section to be shorter.

Next, the imaging device 10 sets the index section including the added section with a time length set in accordance with the sliding length. That is, the imaging device 10 decides the time length of the added section in accordance with the sliding length, and sets the section from the time point preceding the time point, at which the user's finger slid on the live-view screen 300 (corresponding to the point 322 shown in FIG. 18), by the time length as the start point of the index section. Then, the imaging device 10 sets the section of the video image captured after the start point as the index section. At this time, the added section is constituted by the frames captured in the time period from the time point at which the user's finger slid on the display screen to the time point preceding it by the time length. Moreover, the imaging device 10 deletes the unnecessary section at the beginning of the video image preceding the added section (corresponding to the shaded part 314 in the time bar 310 shown in FIG. 18).

As described above, when the user's finger taps and slides on the object 340 on the live-view screen 300, the imaging device 10 allows the added section (316) preceding the time point of tapping the object 340 by the time length in accordance with the sliding length, from among the video image already captured, to be included in the index section, and deletes the unnecessary section (314) preceding the added section. As a result, it is possible to compensate the delay of user's inputting the instruction for the index and allow the section necessary for the user to be appropriately included in the index section. This imaging device 10 is useful particularly because the time length of the index section before the time point of sliding on the display screen (that is, the time length of the added section) can be freely adjusted in accordance with the sliding length.

In addition, the sliding direction may be an arbitrary direction such as the left direction in addition to the right direction shown in FIG. 18. Moreover, the time point as a reference of the added section may be the time point at which the user's finger slides on the object 340 as described above (that is, the time point of inputting the instruction for the index), or may be the time point at which the object 340 is recognized.

As described above, the imaging device 10 according to the embodiment of the invention can set the index section in accordance with the sliding method on the display screen by the user (the gesture with respect to the touch panel 40). As a result, the user can designate the position and the time length of the index section in accordance with the sliding method on the display screen, and set the desirable index section. In addition, the user can freely set the index section with a simple operation of changing the sliding method on the display screen, and perform the editing operation efficiently.

4. Conclusion

As described above, the detail description was made of the imaging device 10 and the image processing method according to the preferable embodiments of the present invention. According to the embodiments of the present invention, the user can add the index not to a time point in the video image but to a section with an appropriate time length with one operation while the video image is captured. As a result, it is not necessary for the user to perform multiple operations on the imaging device 10 in order to add the index to the desirable section in the video image. In addition, the user can add the index with a simple operation, and the imaging device 10 has a satisfactory operability.

Moreover, the user can freely adjust the start point or the last point of the added index while checking the contents of the recording in the record confirmation screen 400 displayed immediately after the completion of the recording of the video image. Accordingly, it is possible to add an index with higher accuracy.

Furthermore, the imaging device 10 makes a correspondence relationship between the set index section and the time axis of the video image, and displays the index section on the live-view screen 300 while the video image is captured or the live-view screen 300 immediately after the recording. As a result, it is possible to show the user the index section of the video image such that the user can easily view the index section, while the video image is captured or immediately after the recording while the user can still remember the contents clearly. Accordingly, the user can know the contents of the video image easily and appropriately, and easily determine the necessity of adjusting the index section or editing the video image.

As described above, it is possible to add the index to the desirable section such as the exciting scene in the video image with high accuracy while the video image is captured and immediately after the completion of the recording while the person who images the video image can remember the contents clearly. Therefore, in replaying and editing the video image later, the user can perform the replaying and the editing operations of the video image efficiently in a short time while using the index section as a guide.

In addition, it is possible to replay only the necessary part (the index section) in the captured video image automatically or by a user's simple operation on the live-view screen 300 or the record confirmation screen 400, and delete the unnecessary part (the sections other than the index section). Accordingly, it is possible to handle the video image more efficiently as compared with the imaging device in related art. Particularly, it is possible to perform the editing operation of deleting the unnecessary part in the recorded image automatically while the video image is captured or by a simple operation on the touch panel 40 immediately after the recording. Therefore, it is possible to perform the editing operation much more efficiently.

In addition, since it is possible to record only the necessary part in the captured video image in the recording medium while the video image is captured or after the completion of the recording as described above, it is possible to efficiently perform the recording operation without wasting the recording medium.

Moreover, according to the second embodiment of the invention, the imaging device 10 with a configuration in which the object recognition is employed for the setting of the index section can add the index to the section of the video image, in which the desirable object 340 appears, with a simple user's operation of designating the object 340 on the live-view screen 300. Accordingly, the user can easily distinguish the section in which the desirable object 340 appears and other sections in replaying or editing the video image after imaging.

Furthermore, according to the third embodiment of the invention, it is possible to detect the user's sliding method on the live-view screen 300 (the gesture) using the touch panel 40, and set the index sections of various variations in accordance with the sliding method. As a result, the user can freely add the index to the desirable section with a simple operation.

The present application contains subject matter related to that disclosed in Japanese Priority Patent Application JP 2009-162839 filed in the Japan Patent Office on Jul. 9, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
a display unit to display a video image being captured;
an index operating unit to input an instruction for an index;
an index setting unit to set as an index section, a section in the video image being captured of a predetermined time period that includes a time point of a user's operation of inputting the instruction for the index, in response to the user's operation on the index operating unit while the video image is being captured,
a recording unit to associate index information representing the index section with the video image and to record the associated index information in a recording medium; and
a display control unit to cause the display unit to display a record confirmation screen of the video image immediately after a second instruction for completion of recording of the video image, make a correspondence relationship between a display object representing the index section and a time axis representing a recording time of the video image based on the index information, and display the display object on the record confirmation screen,
wherein the position detecting unit detects a user's operation on the display object representing the index section displayed on the record confirmation screen,
wherein the index setting unit adjusts the index section in response to the user's operation,
wherein a duration of the predetermined time period is set in advance of the user's operation,
wherein the index operating unit includes a position detecting unit to detect a position in a display screen of the display unit, that an operating body touched or approached, and
wherein the user's operation comprises allowing the operating body to touch or approach the display screen.

2. An imaging device comprising:
a display unit to display a video image being captured;
an index operating unit to input an instruction for an index;
an index setting unit to set as an index section, a section in the video image being captured of a predetermined time period that includes a time point of a user's operation of inputting the instruction for the index, in response to the user's operation on the index operating unit while the video image is being captured,
a recording unit to associate index information representing the index section with the video image and to record the associated index information in a recording medium;
a display control unit to cause the display unit to display a record confirmation screen of the video image immediately after a second instruction for completion of recording of the video image, make a correspondence relationship between a display object representing the index section and a time axis representing a recording time of the video image based on the index information, and display the display object on the record confirmation screen, and
a deletion unit to delete the sections other than the index section in the video image in response to the user's operation on an icon displayed on the record confirmation screen, wherein the position detecting unit detects a user's operation on the display object representing the index section displayed on the record confirmation screen, wherein the index setting unit adjusts the index section in response to the user's operation, wherein a duration of the predetermined time period is set in advance of the user's operation, wherein the index operating unit includes a position detecting unit to detect a position in a display screen of the display unit, that an operating body touched or approached, and wherein the user's operation comprises allowing the operating body to touch or approach the display screen.

* * * * *